(12) United States Patent
Zhu et al.

(10) Patent No.: US 12,057,730 B2
(45) Date of Patent: Aug. 6, 2024

(54) WIRELESS CHARGER AND CHARGING PAD

(71) Applicant: HUAWEI TECHNOLOGIES CO., LTD., Guangdong (CN)

(72) Inventors: Yongfa Zhu, Dongguan (CN); Xiaowei Chen, Dongguan (CN); Jin Qiu, Dongguan (CN); Xueyan Huang, Shenzhen (CN); Tao Ding, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 717 days.

(21) Appl. No.: 17/096,025

(22) Filed: Nov. 12, 2020

(65) Prior Publication Data

US 2021/0066948 A1 Mar. 4, 2021

Related U.S. Application Data

(63) Continuation of application No. PCT/CN2019/081637, filed on Apr. 6, 2019.

(30) Foreign Application Priority Data

Jul. 13, 2018 (CN) .......................... 201810772593.1

(51) Int. Cl.
*H02J 7/02* (2016.01)
*H01F 38/14* (2006.01)
(Continued)

(52) U.S. Cl.
CPC ............... *H02J 7/02* (2013.01); *H01F 38/14* (2013.01); *H02J 7/0042* (2013.01); *H02J 50/005* (2020.01); *H02J 50/10* (2016.02)

(58) Field of Classification Search
USPC ....................................................... 320/108
See application file for complete search history.

(56) References Cited

U.S. PATENT DOCUMENTS

2009/0179501 A1 7/2009 Randall
2015/0015082 A1 1/2015 Kanagawa et al.
(Continued)

FOREIGN PATENT DOCUMENTS

CN 103647308 A 3/2014
CN 104617385 A 5/2015
(Continued)

OTHER PUBLICATIONS

Makoto Takamiya et al, Design of Large Area Electronics with Organic Transistors, 2010IEEE/ACM International Conference On, Nov. 2010, XP031814971, 4 pages.
(Continued)

*Primary Examiner* — Bryce M Aisaka
(74) *Attorney, Agent, or Firm* — WOMBLE BOND DICKINSON (US) LLP

(57) ABSTRACT

This application provides a charging pad used in a wireless charger. The charging pad can be wound. Specifically, the charging pad includes a rigid region and a flexible region, and a structure of the rigid region is different from a structure of the flexible region. A rigid support plate is disposed in the rigid region, and a metal line in the flexible region is in a metal hinge structure or is a bendable metal conducting wire. In addition, this application further provides a wireless charger to which the charging pad is applied.

19 Claims, 11 Drawing Sheets

(51) Int. Cl.
  *H02J 7/00*  (2006.01)
  *H02J 50/00*  (2016.01)
  *H02J 50/10*  (2016.01)

(56)  References Cited

U.S. PATENT DOCUMENTS

| | | |
|---|---|---|
| 2015/0091500 A1 | 4/2015 | Claudepierre |
| 2016/0079762 A1* | 3/2016 | Wang .................. H02J 50/12 |
| | | 307/104 |
| 2017/0264130 A1 | 9/2017 | Lethellier |
| 2020/0037674 A1* | 2/2020 | Brengel ................ A41D 1/002 |

FOREIGN PATENT DOCUMENTS

| | | |
|---|---|---|
| CN | 204794288 U | 11/2015 |
| CN | 106300573 A | 1/2017 |
| CN | 107951153 A | 4/2018 |
| CN | 108879852 A | 11/2018 |
| EP | 3069358 A2 | 9/2016 |
| EP | 3089373 A1 | 11/2016 |
| KR | 20080081480 A | 9/2008 |
| WO | 2008137996 A1 | 11/2008 |
| WO | 2015070202 A2 | 5/2015 |

OTHER PUBLICATIONS

Seungtaek Jeong et al, Design, Simulation and Measurement of Flexible PCB Coils for wearable Device Wireless Power Transfer, 2018 IEEE Wireless Power Transferconference (WPTC), Jun. 2018, XP033517560, 4 pages.

* cited by examiner

WIRELESS CHARGER AND CHARGING PAD

CROSS REFERENCE TO RELATED APPLICATION

This application is a continuation application of international patent application number PCT/CN2019/081637, filed on Apr. 6, 2019, which claims priority to Chinese patent application number 201810772593.1, filed on Jul. 13, 2018. The disclosures of the aforementioned applications are hereby incorporated by reference in their entireties.

TECHNICAL FIELD

This application relates to the field of wireless charging technologies, and in particular, to a wireless charger and a corresponding charging pad.

BACKGROUND

When a contact electric energy transmission technology is used for charging a portable electronic device, different types of power adapters and power cables are usually configured for different types of portable electronic devices. This means that when going outside, an owner of a plurality of portable electronic devices may need to carry a plurality of power adapters and data cables. This case causes relatively poor portability of the portable electronic devices.

Recently, a wireless charging technology has started to be widely used for charging a portable electronic device. In comparison with the contact electric energy transmission technology, in the wireless charging technology, a same wireless charger can be used to charge different types of portable electronic devices. A coil is disposed inside a charging pad of the wireless charger. After being powered on, the coil generates a magnetic field, and a portable electronic device located in the magnetic field and having a wireless charging function is to be charged. However, such a charging pad inside which a coil is disposed has a relatively large area, and is quite inconvenient to carry. Therefore, a problem that needs to be resolved is to provide a wireless charger applied to wireless charging and having a small size.

SUMMARY

This application provides a wireless charger, including a roll shaft and a charging pad. The charging pad can be wound around the roll shaft. After the winding, the wireless charger has a relatively small volume, and therefore is easy to carry. Correspondingly, this application further provides a charging pad applied to the wireless charger.

According to a first aspect, this application provides a wireless charger. The wireless charger includes a columnar roll shaft and a charging pad. One side of the charging pad is embedded in the roll shaft, and the charging pad can be wound around the roll shaft along the side.

A side wall of the roll shaft includes a plurality of planes and a round corner located between two adjacent planes.

The charging pad includes a first planar coil and a first rigid support plate. The first planar coil includes a first rigid part and a first flexible part that are adjacent to each other. The first rigid part is located on an upper surface of the first rigid support plate. A metal line located in the first flexible part is bendable.

When the charging pad is wound around the roll shaft, a region in which the first rigid support plate is located covers a first plane of the roll shaft, and a region in which the first flexible part is located covers a first round corner of the roll shaft.

It should be noted that the first plane is one of the plurality of planes included in the side wall of the roll shaft.

The side wall of the roll shaft includes the plurality of planes, and a round corner is disposed between two adjacent planes. Therefore, the side wall of the roll shaft includes a plurality of round corners. The first round corner is one of the plurality of round corners included in the side wall of the roll shaft.

It should be noted that the first round corner is adjacent to the first plane.

When the charging pad is wound around the roll shaft, the wireless charger has a relatively small volume. Therefore, compared with a wireless charger in the prior art, the wireless charger provided in this embodiment is more convenient to carry.

With reference to the first aspect, in a first possible embodiment, the charging pad further includes a second rigid support plate. Correspondingly, the first planar coil further includes a second rigid part adjacent to the first flexible part, the first flexible part is located between the first rigid part and the second rigid part, and the second rigid part is located on an upper surface of the second rigid support plate. When the charging pad is wound around the roll shaft, a region in which the second rigid support plate is located covers a second plane of the roll shaft.

It should be known that the second plane is one of the plurality of planes included in the side wall of the roll shaft. In addition, the second plane is adjacent to the first round corner, and the first round corner is located between the first plane and the second plane.

Because a rigid support plate is unbendable, a conducting wire in a rigid part located on a surface of the rigid support plate may be thicker than a metal line located in a flexible part. In other words, resistance of the conducting wire located in the rigid part is lower than resistance of the metal line located in the flexible part. In this embodiment, the first planar coil crosses the first rigid support plate and the second rigid support plate. In this way, the wireless charger provided in this embodiment has a relatively high current, and can provide higher charging efficiency.

In an embodiment, the charging pad further includes a second planar coil and a third rigid support plate. The second planar coil includes a third rigid part and a second flexible part that are adjacent to each other, the third rigid part is located on an upper surface of the third rigid support plate, and a metal line located in the second flexible part is bendable.

If the third rigid support plate and the second rigid support plate are placed in a stack-up manner, and a region that is on the charging pad and in which the third rigid support plate is located is the same as the region in which the second rigid support plate is located.

If the second flexible part and the first flexible part are respectively located on two sides of the third rigid part, when the charging pad is wound around the roll shaft, a region in which the second flexible part is located covers a second round corner of the roll shaft.

In an embodiment, the charging pad of the wireless charger further includes the second planar coil, and the second planar coil partially overlaps with the first planar coil. It should be known that a magnetic field generated by the first planar coil on the overlapping part is superimposed onto a magnetic field generated by the second planar coil on the overlapping part. Therefore, a region corresponding to the overlapping part has relatively high magnetic strength. In other words, the region corresponding to the overlapping part has relatively high charging efficiency.

In an embodiment, the charging pad further includes a fourth rigid support plate. Correspondingly, the second planar coil further includes a fourth rigid part adjacent to the second flexible part, the second flexible part is located between the third rigid part and the fourth rigid part, and the fourth rigid part is located on an upper surface of the fourth rigid support plate. When the charging pad is wound around the roll shaft, a region in which the fourth rigid support plate is located covers a third plane of the roll shaft.

The wireless charger provided in this embodiment includes both the first planar coil and the second planar coil, and all other parts of the second planar coil except the third rigid part are located on one side of the first planar coil. Therefore, the wireless charger has a larger charging region. Further, because there is the fourth rigid support plate, resistance of the second planar coil can be reduced, and a current that passes through the second planar coil can be further increased. In this way, the second planar coil has relatively high charging efficiency.

In an embodiment, a lower surface of the third rigid support plate faces the upper surface of the second rigid support plate, and the upper surface of the third rigid support plate is far away from the upper surface of the second rigid support plate, and the upper surface of the second rigid support plate is located in a same plane as the upper surface of the first rigid support plate. In this embodiment, the first rigid support plate is located at a same layer as the second rigid support plate.

In an embodiment, a lower surface of the second rigid support plate faces the upper surface of the third rigid support plate, and the upper surface of the second rigid support plate is far away from the upper surface of the third rigid support plate, and the upper surface of the third rigid support plate is located in a same plane as the upper surface of the first rigid support plate. In this embodiment, the first rigid support plate is located at a same layer as the third rigid support plate.

In an embodiment, the upper surface of the fourth rigid support plate is located in a same plane as the upper surface of the third rigid support plate, or the upper surface of the fourth rigid support plate is located in a same plane as the upper surface of the second rigid support plate.

In an embodiment, a plurality of magnetic strips are disposed on other side edges of the charging pad. When the charging pad is wound around the roll shaft by one layer or less than one layer, the magnetic strips are adsorbed onto the roll shaft. When the charging pad is wound around the roll shaft by more than one layer, a magnetic strip at a first layer of the charging pad is adsorbed onto the roll shaft, and a magnetic strip at an $N^{th}$ layer of the charging pad is adsorbed onto an $(N-1)^{th}$ layer of the charging pad, where N is an integer greater than or equal to 2.

The magnetic strips are designed to avoid a case in which the charging pad extends due to an unexpected contact from an owner of the wireless charger after the charging pad being wound.

According to a second aspect, this application provides a charging pad. The charging pad includes a first planar coil and a first rigid support plate. The first planar coil includes a first rigid part and a first flexible part that are adjacent to each other. The first rigid part is located on an upper surface of the first rigid support plate. A metal line located in the first flexible part is bendable.

In the charging pad provided in this application, the first flexible part is bendable. Therefore, the charging pad can also be folded. The folded charging pad has a relatively small volume, and therefore has good portability.

In an embodiment, the charging pad further includes a second rigid support plate. Correspondingly, the first planar coil further includes a second rigid part adjacent to the first flexible part. It should be noted that the first flexible part is located between the first rigid part and the second rigid part, and the second rigid part is located on an upper surface of the second rigid support plate. In this embodiment, the first planar coil crosses the two rigid support plates. An advantage is that the first planar coil is easy to produce.

In an embodiment, each metal line located in the first flexible part includes a first end part close to the first rigid part, a second end part close to the second rigid part, and a main body part located between the first end part and the second end part. The first end part is connected to a conducting wire in the first rigid part, and the second end part is connected to a conducting wire in the second rigid part.

A sum of a thickness of the first rigid support plate and a thickness of a joint part of the first end part and the conducting wire that is located in the first rigid part and connected to the first end part is greater than or equal to a thickness of the main body part. Further, a sum of a thickness of the second rigid support plate and a thickness of a joint part of the second end part and the conducting wire that is located in the second rigid part and connected to the second end part is also greater than or equal to the thickness of the main body part.

In an embodiment, a sum of a thickness of a joint part located on any of the two ends of the main body part and a thickness of a corresponding rigid support plate is greater than the thickness of the main body part. Therefore, a thickness of the charging pad does not depend on the thickness of the main body part. In other words, the thickness of the main body part does not affect an overall thickness of the charging pad.

In an embodiment, a width of the conducting wire that is located in the first rigid part and connected to the first end part is the same as a width of the first end part.

In an embodiment, a width of the conducting wire that is located in the second rigid part and connected to the second end part is the same as a width of the second end part.

In an embodiment, the width of the conducting wire located in the first rigid part is the same as the width of the conducting wire located in the second rigid part.

In an embodiment, the main body part includes a plurality of metal segments connected in series. Two adjacent metal segments are hinged to each other. The plurality of metal segments include a first metal segment, a second metal segment, and at least one metal segment located between the first metal segment and the second metal segment. One end of the first metal segment is hooked to the first end part, and one end of the second metal segment is hooked to the second end part.

In an embodiment, the main body part located in the first flexible part includes at least three metal segments that are hinged in series. Based on this design, the main body part is bendable, and therefore the charging pad is bendable.

In an embodiment, the first end part includes a horizontal part, a vertical part, and a corner located between the horizontal part and the vertical part. The first metal segment includes a hook part, an extension part, and a corner located between the hook part and the extension part.

The horizontal part of the first end part is fitted to the upper surface of the first rigid support plate and connected to a conducting wire in the first rigid part, and the vertical part of the first end part extends from the corner of the first end part in a direction away from the upper surface of the first rigid support plate.

The hook part of the first metal segment is cross-hooked to the vertical part of the first end part. The extension part of the first metal segment extends from the corner of the first metal segment in a direction away from the first rigid support plate but towards a side wall of the first flexible part, and the extension part of the first metal segment is hinged to an adjacent metal segment.

The first metal segment and the first end part are connected through cross-hook. In comparison with welding, a connection manner provided in this embodiment not only implements a secure connection, but also helps reduce processing complexity.

In an embodiment, a side wall of the vertical part of the first end part faces an inner surface of the extension part of the first metal segment, and a side wall of the hook part of the first metal segment faces an inner surface of a horizontal surface of the first end part.

In an embodiment, the second end part includes a horizontal part, a vertical part, and a corner located between the horizontal part and the vertical part. The second metal segment includes a hook part, an extension part, and a corner located between the hook part and the extension part.

The horizontal part of the second end part is fitted to the upper surface of the second rigid support plate and connected to a conducting wire in the second rigid part, and the vertical part of the second end part extends from the corner of the second end part in a direction away from the upper surface of the second rigid support plate.

The hook part of the second metal segment is cross-hooked to the vertical part of the second end part. The extension part of the second metal segment extends from the corner of the second metal segment in a direction away from the second rigid support plate but towards the side wall of the first flexible part, and the extension part of the second metal segment is hinged to an adjacent metal segment.

Similarly, in an embodiment, the second metal segment and the second end part are connected through cross-hook. In comparison with welding, a connection manner provided in this embodiment not only implements a secure connection, but also helps reduce processing complexity.

In an embodiment, a side wall of the vertical part of the second end part faces an inner surface of the extension part of the second metal segment, and a side wall of the hook part of the second metal segment faces an inner surface of the horizontal part of the second end part.

In an embodiment, the main body part is a metal conducting wire. It should be known that the metal conducting wire is flexible.

In an embodiment, an outer surface of the metal conducting wire is provided with an insulation layer. Specifically, the outer surface of the metal conducting wire is wrapped in an insulation skin or coated with insulating paint.

In an embodiment, a step is disposed on an edge that is of the first rigid support plate and that is close to the first flexible part. Correspondingly, the upper surface of the first rigid support plate includes a top surface and a step surface, and the top surface of the first rigid support plate protrudes relative to the step surface of the first rigid support plate.

The first end part includes a first horizontal part, a first vertical part, and a second horizontal part, and the first vertical part of the first end part is located between the first horizontal part and the second horizontal part of the first end part.

The first horizontal part of the first end part is fitted to the top surface of the first rigid support plate and connected to a conducting wire located in the first rigid part. The second horizontal part of the first end part is fitted to the step surface of the first rigid support plate and connected to a first end of the metal line located in the first flexible part.

The first vertical part of the first end part is fitted to an upper side wall of the first rigid support plate, and the upper side wall of the first rigid support plate is located between the top surface and the step surface of the first rigid support plate and faces the first flexible part.

This design of the step structure helps reduce a height of the main body part, and further reduces the thickness of the charging pad.

In an embodiment, a thickness of a region in which the top surface of the first rigid support plate is located is twice a thickness of a region in which the step surface of the first rigid support plate is located.

In an embodiment, the charging pad further includes a first fixed rod. The first fixed rod crosses second horizontal parts of a plurality of the first end parts, and the first fixed rod is fastened to the step surface of the first rigid support plate in a longitudinal direction of the first fixed rod. The first fixed rod is configured to fix the first end part.

In an embodiment, a step is disposed on an edge that is of the second rigid support plate and that is close to the first flexible part, the upper surface of the second rigid support plate includes a top surface and a step surface, and the top surface of the second rigid support plate protrudes relative to the step surface of the second rigid support plate.

The second end part includes a third horizontal part, a second vertical part, and a fourth horizontal part, and the second vertical part of the second end part is located between the third horizontal part and the fourth horizontal part of the second end part.

The third horizontal part of the second end part is fitted to the top surface of the second rigid support plate and connected to a conducting wire located in the second rigid part. The fourth horizontal part of the second end part is fitted to the step surface of the second rigid support plate and connected to a second end of the metal line located in the first flexible part. The metal line includes a first end and the second end opposite to the first end. The second vertical part of the second end part is fitted to an upper side wall of the second rigid support plate. The upper side wall of the second rigid support plate is located between the top surface and the step surface of the second rigid support plate and faces the first flexible part.

Similarly, this design of the step structure helps reduce the height of the main body part, and further reduces the thickness of the charging pad.

In an embodiment, a thickness of a region in which the top surface of the second rigid support plate is located is twice a thickness of a region in which the step surface of the second rigid support plate is located.

In an embodiment, the charging pad further includes a second fixed rod. The second fixed rod crosses fourth horizontal parts of a plurality of the second end parts. The second fixed rod is fastened to the step surface of the second rigid support plate in a longitudinal direction of the second fixed rod. The second fixed rod is configured to fix the second end part.

In an embodiment, the charging pad further includes a second planar coil and a third rigid support plate. The second planar coil includes a third rigid part and a second flexible part that are adjacent to each other, and the third rigid part is located on an upper surface of the third rigid support plate. A metal line located in the second flexible part is bendable. The third rigid support plate and the second rigid support plate are placed in a stack-up manner, and the second flexible part and the first flexible part are respectively located on two sides of the third rigid part.

In an embodiment, the charging pad includes the first planar coil and the second planar coil, and the first planar coil and the second planar coil have an overlapping part. When a to-be-charged electronic device is located on the overlapping part, the first planar coil and the second planar coil may simultaneously charge the electronic device, so that charging efficiency can be improved. Further, a range of a magnetic field jointly generated by the first planar coil and the second planar coil is greater than a range of a magnetic field generated by the first planar coil alone. Therefore, a location, at which the electronic device is placed, on the charging pad is more flexible.

In an embodiment, a lower surface of the third rigid support plate faces the upper surface of the second rigid support plate, and the upper surface of the third rigid support plate is far away from the upper surface of the second rigid support plate. The upper surface of the second rigid support plate is located in a same plane as the upper surface of the first rigid support plate.

In an embodiment, the third rigid support plate is stacked above the second rigid support plate. In other words, the first rigid part of the first planar coil is located in a same plane as the second rigid part of the first planar coil. The third rigid support plate and the second rigid support plate are placed in the stack-up manner. This design can reduce a volume of the charging pad.

In an embodiment, a lower surface of the second rigid support plate faces the upper surface of the third rigid support plate, and the upper surface of the second rigid support plate is far away from the upper surface of the third rigid support plate. The upper surface of the third rigid support plate is located in a same plane as the upper surface of the first rigid support plate.

In an embodiment, the second rigid support plate is stacked above the third rigid support plate. This design can reduce a volume of the charging pad.

In an embodiment, the charging pad further includes a fourth rigid support plate. Correspondingly, the second planar coil further includes a fourth rigid part adjacent to the second flexible part, and the second flexible part is located between the third rigid part and the fourth rigid part. The fourth rigid part is located on an upper surface of the fourth rigid support plate, and the upper surface of the fourth rigid support plate is located in a same plane as the upper surface of the third rigid support plate.

In an embodiment, the charging pad further includes a fourth rigid support plate. Correspondingly, the second planar coil further includes a fourth rigid part adjacent to the second flexible part, and the second flexible part is located between the third rigid part and the fourth rigid part. The fourth rigid part is located on an upper surface of the fourth rigid support plate, and the upper surface of the fourth rigid support plate is located in a same plane as the upper surface of the second rigid support plate.

According to a third aspect, this application provides another wireless charger. The wireless charger includes a columnar roll shaft and a charging pad. One side of the charging pad is embedded in the roll shaft, and the charging pad can be wound around the roll shaft along the side. A side wall of the roll shaft includes a plurality of planes and a round corner located between two adjacent planes.

The charging pad includes a first planar coil, a first printed circuit board, and a first flexible circuit board. The first planar coil includes a first part and a second part that are adjacent to each other, the first part is located on a surface of or inside the first printed circuit board, and the second part is located on a surface of or inside the first flexible circuit board.

When the charging pad is wound around the roll shaft, a region in which the first printed circuit board is located covers a first plane of the roll shaft, and a region in which the first flexible circuit board is located covers a first round corner of the roll shaft.

It is known that a region in which a printed circuit board is located is a rigid region on the charging pad, a region in which a flexible circuit board is located is a flexible region, and the flexible region is bendable. Therefore, in the wireless charger provided in this embodiment, the charging pad can be wound around the roll shaft. In this way, the wireless charger has a relatively small volume and is easy to carry.

In an embodiment, the charging pad further includes a second printed circuit board. Correspondingly, the first planar coil further includes a third part adjacent to the second part, the second part is located between the first part and the third part, and the third part is located on a surface of or inside the second printed circuit board. When the charging pad is wound around the roll shaft, a region in which the second printed circuit board is located covers a second plane of the roll shaft.

In an embodiment, the first planar coil crosses the two printed circuit boards, metal lines located in the printed circuit boards may be relatively thick, and resistance is relatively low. Therefore, in this embodiment, the first planar coil may have relatively low resistance, and can allow a relatively large current to pass through. In this way, charging efficiency is relatively high.

In an embodiment, a plurality of magnetic strips are disposed on other side edges of the charging pad. When the charging pad is wound around the roll shaft by one layer or less than one layer, the magnetic strips are adsorbed onto the roll shaft. When the charging pad is wound around the roll shaft by more than one layer, a magnetic strip at a first layer of the charging pad is adsorbed onto the roll shaft, and a magnetic strip at an $N^{th}$ layer of the charging pad is adsorbed onto an $(N-1)^{th}$ layer of the charging pad, where N is an integer greater than or equal to 2.

The magnetic strips are designed to avoid a case in which the charging pad extends due to an unexpected contact from an owner of the wireless charger after the charging pad being wound.

According to a fourth aspect, this application provides another charging pad. The charging pad includes a first planar coil, a first printed circuit board, and a first flexible circuit board. The first planar coil includes a first part and a second part that are adjacent to each other, the first part is located on a surface of or inside the first printed circuit board, and the second part is located on a surface of or inside the first flexible circuit board. The charging pad provided in this embodiment includes the first flexible circuit board. Therefore, the charging pad is bendable.

In an embodiment, the charging pad further includes a second printed circuit board. Correspondingly, the first planar coil further includes a third part adjacent to the second part, and the second part is located between the first part and the third part. The third part is located on a surface of or inside the second printed circuit board. In this embodiment, the first planar coil crosses the two printed circuit boards. Advantages are that the first planar coil is easy to produce, and charging efficiency is relatively high.

According to a fifth aspect, this application provides still another wireless charger. The wireless charger includes a columnar roll shaft and a charging pad. One side of the charging pad is embedded in the roll shaft, and the charging pad can be wound around the roll shaft along the side. A side wall of the roll shaft includes a plurality of planes and a round corner located between two adjacent planes.

The charging pad includes a first planar coil, a first printed circuit board, a second printed circuit board, and a first flexible circuit board. The first planar coil is located on a surface of or inside the first flexible circuit board. A first part of the first flexible circuit board is laminated into the first printed circuit board, a second part is laminated into the second printed circuit board, and another part of the first flexible circuit board except the first part and the second part is located between the first part and the second part.

When the charging pad is wound around the roll shaft, a region in which the first printed circuit board is located covers a first plane of the roll shaft, a region in which the another part is located covers a first round corner of the roll shaft, and a region in which the second printed circuit board is located covers a second plane of the roll shaft.

In an embodiment, the region in which the another part is located is flexible and can be wound. Therefore, the charging pad can be wound around the roll shaft. In this way, the wireless charger has a relatively small volume.

In an embodiment, a plurality of magnetic strips are disposed on other side edges of the charging pad. When the charging pad is wound around the roll shaft by one layer or less than one layer, the magnetic strips are adsorbed onto the roll shaft. When the charging pad is wound around the roll shaft by more than one layer, a magnetic strip at a first layer of the charging pad is adsorbed onto the roll shaft, and a magnetic strip at an $N^{th}$ layer of the charging pad is adsorbed onto an $(N-1)^{th}$ layer of the charging pad, where N is an integer greater than or equal to 2.

The magnetic strips are designed to avoid a case in which the charging pad extends due to an unexpected contact from an owner of the wireless charger after the charging pad being wound.

According to a sixth aspect, this application provides still another charging pad. The charging pad includes a first planar coil, a first printed circuit board, a second printed circuit board, and a first flexible circuit board. The first planar coil is located on a surface of or inside the first flexible circuit board. A first part of the first flexible circuit board is laminated into the first printed circuit board, a second part is laminated into the second printed circuit board, and another part of the first flexible circuit board except the first part and the second part is located between the first part and the second part.

In an embodiment, a region in which the another part is located is flexible and can be wound. Therefore, the charging pad is bendable. In this way, a wireless charger to which the charging pad is applied can be wound, and has a relatively small volume.

DESCRIPTION OF EMBODIMENTS

Figure 1A:
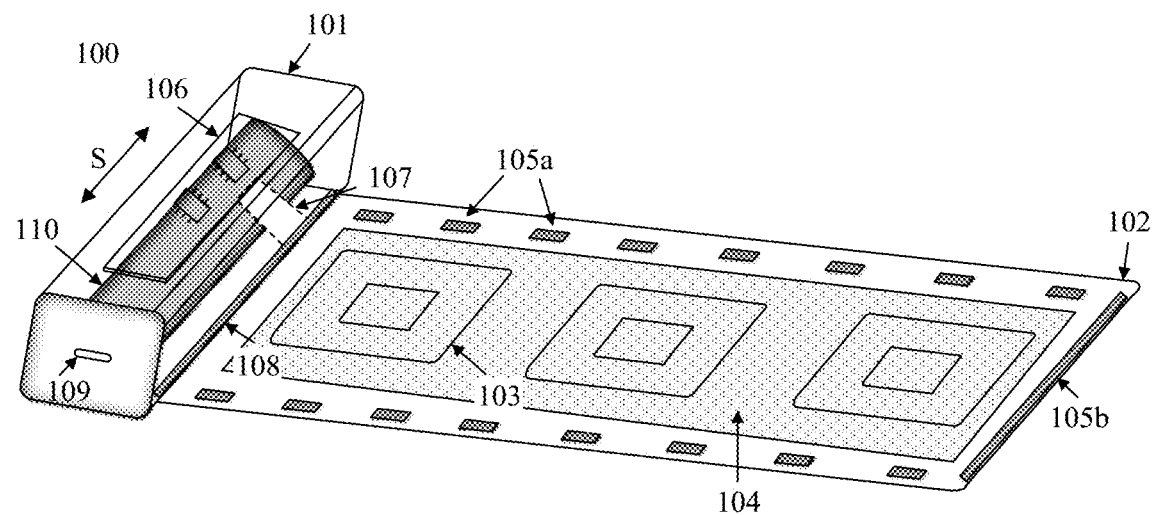
FIG. 1A is a schematic diagram of a wireless charger according to an embodiment of this application.
Figure 1B:
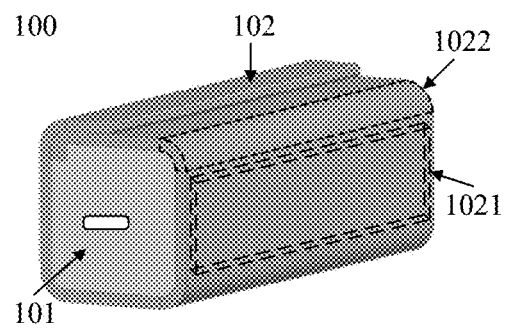
FIG. 1B is a schematic diagram of the wireless charger shown in FIG. 1A in a wound state.

This application provides a wireless charger. As shown in FIG. 1A, the wireless charger 100 includes a roll shaft 101 and a charging pad 102. The charging pad 102 can be wound around the roll shaft 101. FIG. 1B shows a structure of the wireless charger after the charging pad 102 is wound around the roll shaft 101.

A narrow and long opening 108 is disposed on the roll shaft 101. If one side of the charging pad 102 is embedded and fastened in the roll shaft 101 by using the opening 108, the charging pad 102 can be wound around the roll shaft 101 along the side layer by layer.

The roll shaft 101 is usually made of a material with relatively high rigidity, such as metal or plastic.

In an embodiment, the roll shaft 101 is columnar (as shown in FIG. 1A, the roll shaft 101 may extend in a direction of S). Further, a cross section or an end surface of the roll shaft 101 is a polygon, and a chamfer is disposed between two adjacent sides of the polygon. In other words, there are a plurality of planes 1021 on a side surface of the roll shaft 101, and a round corner 1022 is disposed between two adjacent planes. As shown in FIG. 1B, when the charging pad 102 is wound around the roll shaft 101, a rigid region of the charging pad 102 is fitted to a plane of the roll shaft 101, and a flexible region of the charging pad 102 is fitted to a round corner of the roll shaft 101. It should be noted that the rigid region is a region that is unbendable, and the flexible region is a region that is bendable. Herein, a specific region that is called the rigid region or the flexible region on the charging pad needs to be understood with reference to the following descriptions of the charging pad.

The charging pad described in this application may be a rectangle. The rigid region may also be a rectangle, and a length of the rigid region is the same as a width of the charging pad. In a longitudinal direction of the charging pad, there are a plurality of rigid regions that are placed in parallel at intervals. It should be known that a width of a flexible region between two adjacent rigid regions depends on a width of a round corner corresponding to the flexible region. Assuming that round corners between every two adjacent planes of the roll shaft are the same, a thickness of the charging pad is determined, and the charging pad is wound around the roll shaft by two layers, for a part of the charging pad corresponding to a first layer, flexible regions between every two adjacent rigid regions have a same width, and for a part of the charging pad corresponding to a second layer, flexible regions between every two adjacent rigid regions also have a same width. However, a width of each flexible region located on the part of the charging pad corresponding to the first layer is less than a width of each flexible region located on the part of the charging pad corresponding to the second layer.

In an embodiment, as shown in FIG. 1A, a plurality of magnetic strips 105a are distributed on both a first edge and a second edge corresponding to the first edge that are of the charging pad 102 described in this application. Both the first edge and the second edge intersect with an edge that is of the charging pad 102 and that is embedded in the narrow and long opening 108 on the roll shaft 101. In an embodiment, both the first edge and the second edge are perpendicular to the edge that is of the charging pad 102 and that is embedded in the narrow and long opening 108 on the roll shaft 101. When the charging pad 102 is wound around the roll shaft 101, the magnetic strips 105a are configured to fix the charging pad 102 on the roll shaft 101. When the charging pad 102 is wound around the roll shaft 101 by only one layer or less than one layer, the magnetic strips 105a are adsorbed onto the roll shaft 101. When the charging pad 102 is wound around the roll shaft 101 by a plurality of layers, a magnetic strip 105a located on a part of the charging pad 102 corresponding to an innermost layer is adsorbed onto the roll shaft 101, and a magnetic strip 105a located on a part of the charging pad 102 corresponding to an $N^{th}$ layer is adsorbed onto a part of the charging pad 102 corresponding to an $(N-1)^{th}$ layer. It should be noted that, when the charging pad 102 is wound around the roll shaft 101 by the plurality of layers, the innermost layer is the first layer. Therefore, it is easily known that the $N^{th}$ layer is located outside the $(N-1)^{th}$ layer.

In an embodiment, at least one magnetic strip 105b is also disposed on a third edge of the charging pad 102. The third edge is opposite to the edge that is of the charging pad 102 and that is embedded in the narrow and long opening 108 on the roll shaft 101. When the charging pad 102 is wound around the roll shaft 101 by only one layer or less than one layer, the magnetic strip 105b on the third edge is adsorbed onto the roll shaft 101. When the charging pad 102 is wound around the roll shaft 101 by a plurality of layers, the magnetic strip 105b on the third edge is adsorbed onto a secondary outer layer of the charging pad 102 wound around the roll shaft 101.

It should be noted that, as shown in FIG. 1A, in addition to the narrow and long opening 108, the roll shaft 101 may further include a wireless charging power unit 106. The wireless charging power unit 106 includes a control circuit, a drive circuit, and the like that are used for wireless charging. Correspondingly, a coil 103 in the charging pad 102 is connected to the wireless charging power unit 106.

In an embodiment, as shown in FIG. 1A, if a printed circuit board 107 is further disposed inside the roll shaft 101, the coil 103 is connected to the wireless charging power unit 106 by using the printed circuit board 107. In an embodiment, the printed circuit board 107 is flexible. It should be known that, when no printed circuit board 107 is disposed inside the roll shaft 101, the coil 103 may be connected to the wireless charging power unit 106 by using a metal conducting wire.

In an embodiment of this application, as shown in FIG. 1A, an interface 109 is disposed on an end surface of the roll shaft 101. The interface 109 may be interconnected to an interface of a cable, to receive a current through the cable. In an embodiment, the interface 109 may be a type-C (Type-C) interface, a lightning (Lightning) interface, or the like.

Further, a battery 110 may be further included inside the roll shaft 101. The battery 110 is configured to provide a current for the coil 103 in the charging pad 102.

Figure 2A:
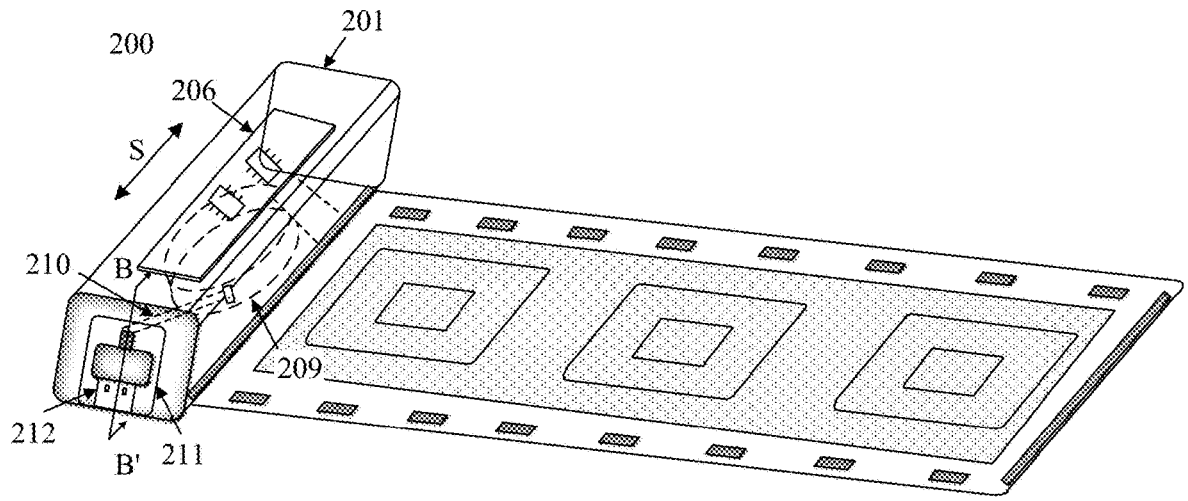
FIG. 2A is a schematic diagram of another wireless charger according to an embodiment of this application.

In another embodiment of this application, FIG. 2A shows another wireless charger 200. A groove 211 and a USB interface 212 are disposed on an end surface of a roll shaft 201. The groove 211 is used to accommodate the USB interface 212. The USB interface 212 has an outer surface and an inner surface that are opposite. When the USB interface 212 is accommodated in the groove 211, the outer surface of the USB interface 212 is flush with the end surface of the roll shaft 201.

Figure 2B:
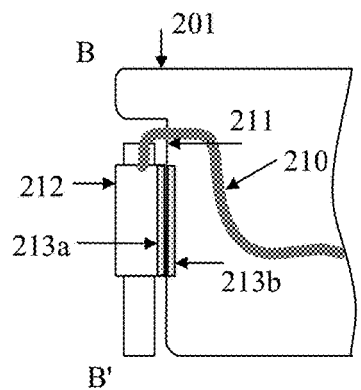
FIG. 2B is a locally enlarged diagram of an end of a roll shaft 201 shown in FIG. 2A.

In an embodiment, as shown in FIG. 2B, a magnet 213a is disposed on the inner surface of the USB interface 212. Correspondingly, a magnet 213b is disposed at the bottom of the groove 211. The magnet 213a and the magnet 213b attract each other. It should be known that the USB interface 212 is fastened in the groove 211 through mutual attraction between the magnet 213a and the magnet 213b.

In this embodiment, as shown in FIG. 2A, a wireless charging power unit 206, a reel winder 209, and a cable 210 are disposed inside the roll shaft 201. The cable 210 is wound around the reel winder 209. After the cable 210 is wound around the reel winder 209, one end of the cable 210 is connected to the wireless charging power unit 206, and the other end is connected to the USB interface 212.

Figure 3:
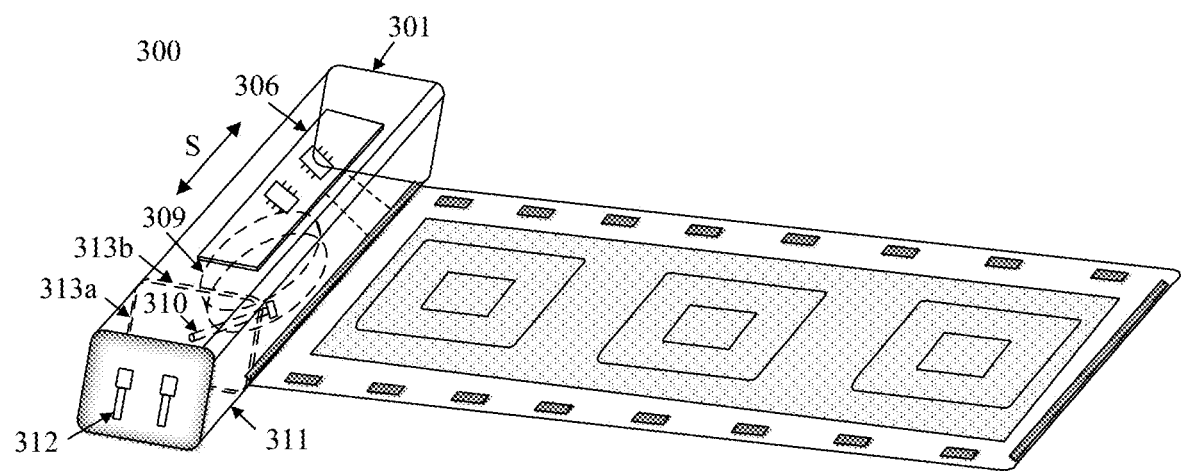
FIG. 3 is a schematic diagram of still another wireless charger according to an embodiment of this application.

In still another embodiment of this application, as shown in FIG. 3, a wireless charger 300 further includes a power adapter 311. The power adapter 311 is fastened on a roll shaft 301 by using a mechanical structure such as a clip. It should be noted that the power adapter 311 is also columnar, or the power adapter 311 may also extend in a direction of S. Further, a first end surface of the power adapter 311 faces a first end surface of the roll shaft 301, and is in contact with the first end surface of the roll shaft 301.

In an embodiment, a magnet 313a is disposed on the first end surface of the power adapter 311. Correspondingly, a magnet 313b is disposed on the first end surface of the roll shaft 301. The magnet 313a and the magnet 313b attract each other. In this implementation, the power adapter 311 is fastened on the roll shaft 301 through mutual attraction between the magnet 313a and the magnet 313b.

Further, as shown in FIG. 3, a plug 312 is disposed on a second end surface of the power adapter 311. The plug 312 is foldable. Two pins of the plug 312 are usually accommodated in an accommodating part located on the second end surface. When the plug 312 is inserted into a socket, the two pins of the plug 312 stretch out from the accommodating part on the second end surface and are inserted into the socket. It should be noted that, when the two pins of the plug 312 are folded and accommodated in the accommodating part, the second end surface of the power adapter 311 is a plane.

When the wireless charger 300 further includes the power adapter 311, as shown in FIG. 3, a reel winder 309 and a cable 310 are further disposed inside the roll shaft 301. The cable 310 is wound around the reel winder 309. After the cable 310 is wound around the reel winder 309, one end of the cable 310 is connected to a wireless charging power unit 306, and the other end is connected to the power adapter 311. When the power adapter 311 needs to be pulled out, the cable 310 may stretch out from the reel winder 309. Therefore, the power adapter 311 can be pulled out to a location that falls within a length range of the cable 310.

Figure 4A:
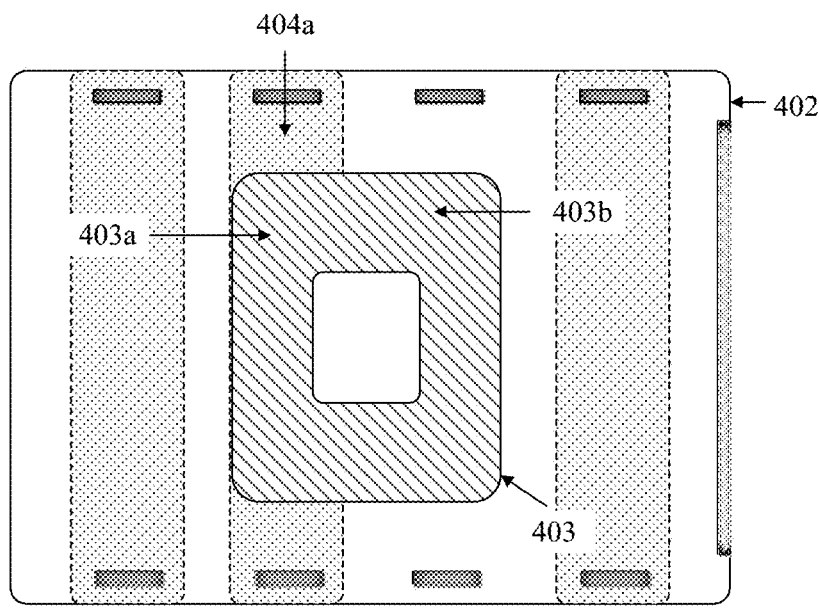
FIG. 4A is a schematic diagram of a charging pad according to an embodiment of this application.
Figure 4B:
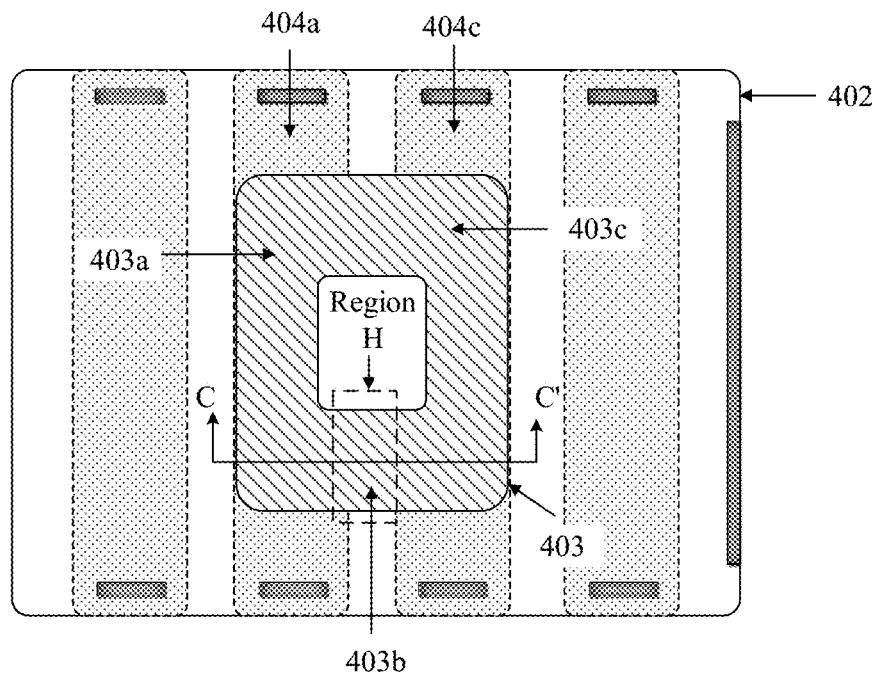
FIG. 4B is a schematic diagram of another charging pad according to an embodiment of this application.

FIG. 4A and FIG. 4B each show a charging pad 402 according to an embodiment of this application. Specifically, as shown in FIG. 4A, the charging pad 402 includes at least one first planar coil 403 and at least one first rigid support plate 404a. The first planar coil 403 includes a first rigid part 403a and a first flexible part 403b that are adjacent to each other.

It should be known that the first rigid part 403a includes a plurality of conducting wires, and the first flexible part 403b includes a plurality of metal lines. It should be noted that the conducting wires located in the first rigid part 403a are connected to the metal lines located in the first flexible part 403b in a one-to-one manner. Two ends of most conducting wires located in the first rigid part 403a are respectively connected to two ends of metal lines located in the first flexible part 403b. There are further one or two conducting wires in the first rigid part 403a. One end of each of these conducting wires is connected to one end of one metal line located in the first flexible part 403b, and the other end is led out and connected to a wireless charging power unit on a roll shaft.

In an embodiment, the first planar coil may be in a circular shape, an elliptical shape, a polygon shape, or the like. It should be noted that another planar coil (for example, a second planar coil) described in this application may also be in a circular shape, an elliptical shape, a polygon shape, or the like. In an embodiment, a plurality of planar coils located in the charging pad are in a same shape.

In an embodiment of this application, as shown in FIG. 4A, the first rigid part 403a is located on an upper surface of the first rigid support plate 404a. Further, the first rigid part 403a is laid flat on the upper surface of the first rigid support plate 404a. It should be noted that an upper surface or a lower surface described in this application is used to distinguish between different surfaces. The "upper surface of the first rigid support plate 404a" herein is described based on a position shown in FIG. 4A on a current page. For descriptions of an upper surface or a lower surface described in other parts of this application, refer to the explanation herein. Details are not described again in the other parts.

It should be noted that the first rigid support plate 404a may be made of resin or plastic. In an embodiment, the first rigid support plate 404a may be a printed circuit board. In this case, the first rigid part 403a may be printed or etched on the upper surface of the first rigid support plate 404a. It should be known that the printed circuit board may be a multilayer board.

It should be noted that, in this application, as shown in FIG. 4A, the metal line in the first flexible part 403b is bendable. In an embodiment, the metal line located in the first flexible part 403b may be a flexible metal wire, a Litz (Litz) wire, a metal hinge, or the like. In an embodiment, when both the metal line located in the first flexible part 403b and the conducting wire located in the first rigid part 403a are metal wires of a same material (for example, copper wires), the metal line located in the first flexible part 403b is thinner than the conducting wire located in the first rigid part 403a (in other words, a cross sectional area of the metal line located in the first flexible part 403b is less than a cross sectional area of the conducting wire located in the first rigid part 403a). Therefore, the metal line located in the first flexible part 403b has flexibility superior to that of the conducting wire located in the first rigid part 403a.

It should be noted that the conducting wire located in the first rigid part should be as wide as possible, to reduce resistance of the first planar coil. Correspondingly, a distance between two adjacent metal lines located in the first rigid part should be as short as possible. In an embodiment, a distance between two adjacent conducting wires located in the first rigid part may be greater than 0 and less than or equal to 0.5 millimeter.

Figure 4C:
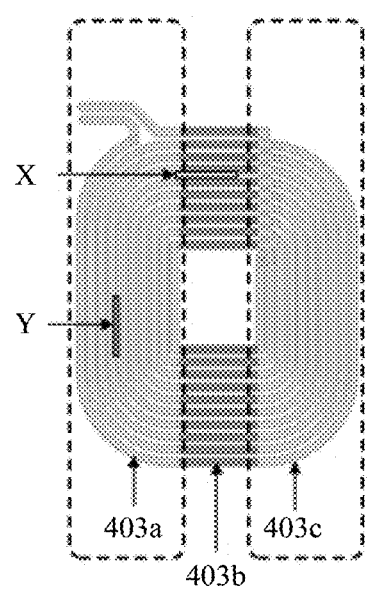
FIG. 4C is a schematic structural diagram of a planar coil located in a charging pad according to an embodiment of this application.

As shown in FIG. 4C, the distance between the two adjacent conducting wires located in the first rigid part 403a is smoothly transited from Y to X, to improve a position deviation experience effect of the first planar coil during wireless charging, where X is greater than Y, and Y is greater than 0. A spacing that is between two adjacent conducting wires located in the first rigid part 403a and that is close to the first flexible part 403b is Y, and a spacing that is between two adjacent conducting wires and that is far from the first flexible part 403b is X.

It should be noted that, when the charging pad provided in the foregoing embodiment is wound around a roll shaft of a wireless charger, a region in which the first rigid support plate is located covers a first plane of the roll shaft, and a region in which the first flexible part is located covers a first round corner of the roll shaft.

It should be known that a side wall of the roll shaft includes a plurality of planes and the first plane is one of the plurality of planes. Further, a round corner is disposed between every two adjacent planes. Therefore, the side wall of the roll shaft includes a plurality of round corners. Correspondingly, the first round corner is one of the plurality of round corners. It should be noted that the plurality of planes are usually at least three planes. However, a case of two planes or even one plane is not excluded. When the roll shaft includes only one plane, the roll shaft further includes only one round corner. In this case, the plane is the first plane, and the round corner is the first round corner. When the roll shaft includes two planes, the roll shaft includes two round corners.

The "region in which the first rigid support plate is located" is explained herein. The "region in which the first rigid support plate is located" described in this application is a region, in which the first rigid support plate is located, on the charging pad. In an embodiment, the charging pad may be separated along an edge of the first rigid support plate and in a direction perpendicular to the charging pad, and an obtained part of the charging pad is the region in which the first rigid support plate is located.

For a "region in which the second flexible part is located", a "region in which the first printed circuit board is located", a "region in which the second printed circuit board is located", or the like described in other parts of this application, refer to the explanation herein for understanding. Details are not described again in corresponding parts.

Further, as shown in FIG. 4B, the charging pad 402 provided in this application further includes a second rigid support plate 404c. A second rigid part 403c of the first planar coil 403 is located on an upper surface of the second rigid support plate 404c. The first flexible part 403b is located between the first rigid part 403a and the second rigid part 403c, and is separately adjacent to the first rigid part 403a and the second rigid part 403c. It should be noted that, as shown in FIG. 4C, the second rigid part 403c also includes a plurality of conducting wires, and the conducting wires located in the second rigid part 403c are connected to the metal lines located in the first flexible part 403b in a one-to-one manner. It should be noted that the first rigid part 403a, the first flexible part 403b, and the second rigid part 403c each are a part of the first planar coil 403, and connection relationships between the first rigid part 403a and the first flexible part 403b and between the first flexible part 403b and the second rigid part 403c depend on a winding direction of wires of the first planar coil 403.

In an embodiment, a distance between two adjacent conducting wires located in the second rigid part is greater than 0 and less than or equal to 0.5 millimeter.

It should be noted that the second rigid part has a structure the same as or similar to that of the first rigid part. Therefore, for further understanding of the second rigid part, refer to descriptions of the first rigid part in this application.

Figure 5A:
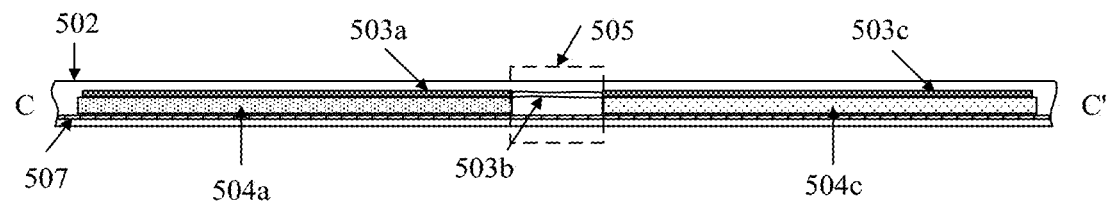
FIG. 5A is a cutaway view of the charging pad shown in FIG. 4B in a direction of CC'.
Figure 5B:
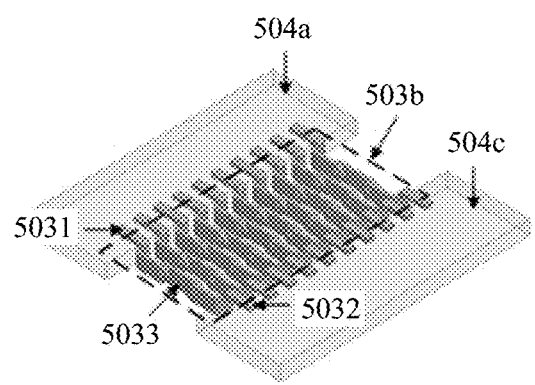
FIG. 5B is a locally enlarged diagram of a part 505 shown in FIG. 5A.

It should be noted that FIG. 5A is a cutaway view obtained by separating the charging pad along CC' in FIG. 4B, and FIG. 5B is a locally enlarged top view of a flexible region 505 shown in FIG. 5A. As shown in FIG. 5A and FIG. 5B, when the charging pad 502 further includes the second rigid part 503c, each metal line located in the first flexible part 503b includes a first end part 5031, a second end part 5032 opposite to the first end part 5031, and a main body part 5033 located between the first end part 5031 and the second end part 5032. The first end part 5031 is connected to a conducting wire located in the first rigid part 503a, and the second end part 5032 is connected to a conducting wire located in the second rigid part 503c (where the conducting wires are not shown in FIG. 5B).

In an embodiment, to reduce impact of a thickness of the main body part on an overall thickness of the charging pad, after the first end part is connected to the conducting wire located in the first rigid part, a sum of a thickness of the first rigid support plate and a thickness of a joint part of the first end part and the conducting wire located in the first rigid part is greater than or equal to the thickness of the main body part. Further, after the second end part is connected to the conducting wire located in the second rigid part, a sum of a thickness of the second rigid support plate and a thickness of a joint part of the second end part and the conducting wire located in the second rigid part is greater than or equal to the thickness of the main body part. It should be noted that both a thickness direction of each joint part and a thickness direction of the main body part are the same as a thickness direction of the first rigid support plate.

In an embodiment, a width of the first end part is the same as a width of the conducting wire located in the first rigid part. Further, a width of the second end part is the same as a width of the conducting wire located in the second rigid part.

In an embodiment, the width of the first end part is the same as the width of the second end part.

To meet through-current and bending reliability requirements, both the first end part and the second end part should be as thin as possible. In an embodiment, a thickness of the first end part and a thickness of the second end part each are greater than or equal to 0.2 millimeter. It should be known that a thickness direction of the first end part and a thickness direction of the second end part are the same as the thickness direction of the first rigid support plate (or a thickness direction of the second rigid support plate).

In an embodiment, to avoid a short circuit that occurs during welding due to a relatively small spacing between two adjacent first end parts, a distance between the two adjacent first end parts is greater than or equal to 0.5 millimeter.

In an embodiment, to avoid a short circuit that occurs during welding due to a relatively small spacing between two adjacent second end parts, a distance between the two adjacent second end parts is greater than or equal to 0.5 millimeter.

In an embodiment of this application, as shown in FIG. 5B, the main body part 5033 includes a plurality of metal segments that are connected in series, and end parts that are of every two adjacent metal segments and that are close to each other are hinged to each other. In an embodiment, a side wall of the plurality of metal segments faces a same direction as the upper surface of the first rigid support plate. The plurality of metal segments include a first metal segment, a second metal segment, and at least one metal segment located between the first metal segment and the second metal segment. One end of the first metal segment is hinged to one end of the first end part, and the other end of the first end part is close to the first rigid part. One end of the first end part is opposite to the other end. Similarly, one end of the second metal segment is hinged to one end of the second end part, and the other end of the second end part is close to the second rigid part. One end of the second end part is also opposite to the other end.

Assuming that there are three metal segments, a third metal segment is located between the first metal segment and the second metal segment, the other end of the first metal segment is hinged to one end of the third metal segment, and the other end of the second metal segment is hinged to the other end of the third metal segment. In other words, a sequence from the first end part to the second end part is the first metal segment, the third metal segment, and the second metal segment.

In an embodiment of this embodiment, as shown in FIG. 5B, the first end part 5031 includes a horizontal part, a vertical part, and a corner located between the horizontal part and the vertical part. The first metal segment includes a hook part, an extension part, and a corner located between the hook part and the extension part. In an embodiment, the first end part 5031 is in a shape of, and the first metal segment is in a shape of. It should be noted that the horizontal part of the first end part 5031 is fitted to the upper surface of the first rigid support plate 504a, and the vertical part of the first end part 5031 extends from the corner of the first end part 5031 in a direction away from the upper surface of the first rigid support plate 504a. It should be known that the first end part 5031 is located on an edge of the first rigid support plate 504a.

The hook part of the first metal segment is cross-hooked to the vertical part of the first end part 5031. To be specific, an inner surface of the hook part of the first metal segment is in contact with an inner surface of the vertical part of the first end part 5031. The inner surface of the hook part of the first metal segment is far away from a side wall that is of the first rigid support plate 504a and that faces the first flexible part, and an inner surface of the vertical part of the first end part 5031 faces the side wall that is of the first rigid support plate 504a and that faces the first flexible part. In other words, the inner surface of the hook part of the first metal segment is face-to-face with the inner surface of the vertical part of the first end part 5031. It should be noted that a side wall of the vertical part of the first end part 5031 faces an inner surface of the extension part of the first metal segment, and a side wall of the hook part of the first metal segment faces an inner surface of the horizontal part of the first end part 5031. The inner surface of the horizontal part of the first end part 5031 faces a lower surface of the first rigid support plate 504a.

Further, the side wall of the vertical part of the first end part 5031 is abutted with the corner of the first metal segment. Alternatively, the side wall of the hook part of the first metal segment is abutted with the corner of the first end part 5031.

In an embodiment, an outer surface of the hook part of the first metal segment is fitted to the side wall that is of the first rigid support plate 504a and that faces the first flexible part. It should be known that the outer surface of the hook part of the first metal segment is opposite to the inner surface of the hook part of the first metal segment.

In an embodiment, to ensure reliability of a connection between the horizontal part of the first end part 5031 and the upper surface of the first rigid support plate 504a, a length of the horizontal part of the first end part 5031 is greater than or equal to 1 millimeter. The horizontal part of the first end part 5031 may be welded to the upper surface of the first rigid support plate 504a. To ensure that the horizontal part of the first end part 5031 is fastened to the upper surface of the first rigid support plate 504a, the horizontal part of the first end part 5031 may be first welded to the upper surface of the first rigid support plate 504a, and further fastened in a glue dispensing manner.

In another embodiment of this embodiment, as shown in FIG. 5B, the second end part 5032 includes a horizontal part, a vertical part, and a corner located between the horizontal part and the vertical part. The second metal segment includes a hook part, an extension part, and a corner located between the hook part and the extension part.

In an embodiment, the second end part 5032 is in a shape of, and the second metal segment is in a shape of. It should be noted that the horizontal part of the second end part 5032 is fitted to the upper surface of the second rigid support plate 504c, and the vertical part of the second end part 5032 extends from the corner of the second end part 5032 in a direction away from the upper surface of the second rigid support plate 504c. It should be known that the second end part 5032 is located on an edge of the second rigid support plate 504c.

The hook part of the second metal segment is cross-hooked to the vertical part of the second end part 5032. To be specific, an inner surface of the hook part of the second metal segment is in contact with an inner surface of the vertical part of the second end part 5032. The inner surface of the hook part of the second metal segment is far away from a side wall that is of the second rigid support plate 504c and that faces the first flexible part, and an inner surface of the vertical part of the second end part 5032 faces the side wall that is of the second rigid support plate 504c and that faces the first flexible part. In other words, the inner surface of the hook part of the second metal segment is face-to-face with the inner surface of the vertical part of the second end part. It should be noted that a side wall of the vertical part of the second end part 5032 faces an inner surface of the extension part of the second metal segment, and a side wall of the hook part of the second metal segment faces an inner surface of the horizontal part of the second end part 5032. The inner surface of the horizontal part of the second end part 5032 faces a lower surface of the second rigid support plate 504c.

Further, the side wall of the vertical part of the second end part 5032 is abutted with the corner of the second metal segment. Alternatively, the side wall of the hook part of the second metal segment is abutted with the corner of the second end part 5032.

In an embodiment, an outer surface of the hook part of the second metal segment is fitted to the side wall that is of the second rigid support plate 504c and that faces the first flexible part. It should be known that the outer surface of the hook part of the second metal segment is opposite to the inner surface of the hook part of the second metal segment.

In an embodiment, a length of the horizontal part of the second end part is greater than or equal to 1 millimeter.

Figure 6A:
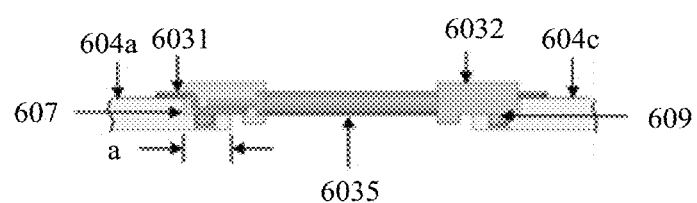
FIG. 6A is another locally enlarged side view of a part 505 shown in FIG. 5A.
Figure 6B:
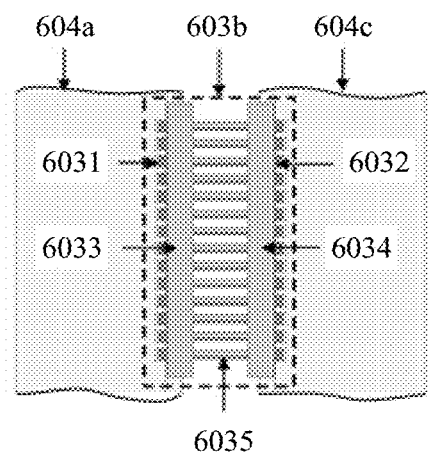
FIG. 6B is another locally enlarged top view of a part 505 shown in FIG. 5A.

In still another embodiment of this application, as shown in FIG. 6A and FIG. 6B, the main body part is a metal conducting wire 6035. In an embodiment, an outer surface of the metal conducting wire is provided with an insulation layer. The insulation layer may be insulating paint coated on the outer surface of the metal conducting wire, or may be an insulation skin wrapping the outer surface of the metal conducting wire.

In an embodiment of this embodiment, as shown in FIG. 6A, a step 607 is disposed on an edge that is of the first rigid support plate 604a and that is close to the first flexible part 603b. Correspondingly, the upper surface of the first rigid support plate 604a includes a top surface and a step surface. A height of the step surface of the first rigid support plate 604a is less than a height of the top surface of the first rigid support plate 604a. In an embodiment, the height of the top surface of the first rigid support plate 604a is twice the height of the step surface of the first rigid support plate 604a. The height of the step surface of the first rigid support plate 604a is a distance between the step surface of the first rigid support plate 604a and a lower surface of the first rigid support plate 604a. The height of the top surface of the first rigid support plate 604a is a distance between the top surface of the first rigid support plate 604a and the lower surface of the first rigid support plate 604a. It should be noted that, in this application, the height of the top surface of the first rigid support plate 604a is also referred to as a thickness of the first rigid support plate 604a or a thickness of a region in which the top surface of the first rigid support plate 604a is located. The height of the step surface of the first rigid support plate 604a is also referred to as a thickness of a region in which the step surface of the first rigid support plate 604a is located.

In an embodiment, the step 607 located on the edge of the first rigid support plate 604a may be disposed by using a plate edge milling processing. Advantages of disposing the step 607 on the edge of the first rigid support plate 604a are as follows: On the one hand, impact of the thickness of the main body part on the thickness of the charging pad is reduced. On the other hand, squeeze caused by the first end part to a width of the first flexible part is reduced, and a length of a metal line located in the first flexible part is increased. After the charging pad is bent, the first end part bears lower stress, and therefore the charging pad has better winding reliability.

It should be noted that, corresponding to the step 607 located on the edge of the first rigid support plate 604a, the first end part 6031 includes a first horizontal part, a second horizontal part, and a first vertical part located between the first horizontal part and the second horizontal part. It should be known that a corner is disposed between the first horizontal part and the first vertical part of the first end part 6031, and a corner is also disposed between the first vertical part and the second horizontal part of the first end part 6031. In an embodiment, the first end part 6031 is formed through two times of bending.

Further, the first horizontal part of the first end part 6031 is fitted to the top surface of the first rigid support plate 604a and connected to a conducting wire located in the first rigid part. The second horizontal part of the first end part 6031 is fitted to the step surface of the first rigid support plate 604a and connected to a first end of the metal line located in the first flexible part. The first vertical part of the first end part 6031 is fitted to an upper side wall that is of the first rigid support plate 604a and that faces the first flexible part. It should be noted that the upper side wall of the first rigid support plate 604a is located between the top surface and the step surface of the first rigid support plate 604a and faces the first flexible part.

In an embodiment, a width of the step surface (that is, a in FIG. 6A) of the first rigid support plate 604a is greater than or equal to 1.5 millimeters. In this application, optionally, the upper side wall of the first rigid support plate 604a is a plane. It should be noted that a width direction of the step surface is the same as a direction of a straight line perpendicular to the upper side wall of the first rigid support plate 604a.

In an embodiment, as shown in FIG. 6B, the charging pad further includes a first fixed rod 6033. The first fixed rod 6033 crosses second horizontal parts of all of the first end parts 6031. The first fixed rod 6033 is fastened to the step surface of the first rigid support plate 604a in a longitudinal direction of the first fixed rod 6033. In an embodiment, two ends of the first fixed rod 6033 are separately fastened to different positions on the step surface of the first rigid support plate 604a. In an embodiment, the first fixed rod 6033 may be covered in a housing.

In an embodiment of this embodiment, as shown in FIG. 6A, a step 609 is disposed on an edge that is of the second rigid support plate 604c and that is close to the first flexible part. Correspondingly, the upper surface of the second rigid support plate 604c includes a top surface and a step surface. A height of the step surface of the second rigid support plate 604c is less than a height of the top surface of the second rigid support plate 604c. In an embodiment, the height of the top surface of the second rigid support plate 604c is twice the height of the step surface of the second rigid support plate 604c. The height of the step surface of the second rigid support plate 604c is a distance between the step surface of the second rigid support plate 604c and a lower surface of the second rigid support plate 604c. The height of the top surface of the second rigid support plate 604c is a distance between the top surface of the second rigid support plate 604c and the lower surface of the second rigid support plate 604c. It should be noted that, in this application, the height of the top surface of the second rigid support plate 604c is also referred to as a thickness of the second rigid support plate 604c or a thickness of a region in which the top surface of the second rigid support plate 604c is located. The height of the step surface of the second rigid support plate 604c is also referred to as a thickness of a region in which the step surface of the second rigid support plate 604c is located.

It should be noted that, corresponding to the step 609 located on the edge of the second rigid support plate 604c, the second end part 6032 includes a third horizontal part, a fourth horizontal part, and a second vertical part located between the third horizontal part and the fourth horizontal part. It should be known that a corner is disposed between the third horizontal part and the second vertical part of the second end part 6032, and a corner is also disposed between the second vertical part and the fourth horizontal part of the second end part 6032. In an embodiment, the second end part 6032 is formed through two times of bending.

Further, the third horizontal part of the second end part 6032 is fitted to the top surface of the second rigid support plate 604c and connected to a conducting wire located in the second rigid part. The fourth horizontal part of the second end part 6032 is fitted to the step surface of the second rigid support plate 604c and connected to a second end of the metal line located in the first flexible part. It should be known that a first end of the metal line 6035 is connected to the second horizontal part that is of the first end part 6031 and that is fitted to the step surface of the first rigid support plate 604a. The second vertical part of the second end part 6032 is fitted to an upper side wall that is of the second rigid support plate 604c and that faces the first flexible part. It should be noted that the upper side wall of the second rigid support plate 604c is located between the top surface and the step surface of the second rigid support plate 604c and faces the first flexible part.

In an embodiment, a width of the step surface of the second rigid support plate 604c is greater than or equal to 1.5 millimeters. In this application, in an embodiment, the upper side wall of the second rigid support plate 604c is a plane. It should be noted that a width direction of the step surface is the same as a direction of a straight line perpendicular to the upper side wall of the second rigid support plate 604c.

The second rigid support plate 604c and the first rigid support plate 604a may be symmetrical. Therefore, the foregoing limitation on the first rigid support plate 604a is also applicable to the second rigid support plate 604c. For brevity, details are not described herein again.

In an embodiment, the charging pad further includes a second fixed rod 6034. The second fixed rod 6034 crosses fourth horizontal parts of all of the second end parts 6032. The second fixed rod 6034 is fastened to the step surface of the second rigid support plate 604c in a longitudinal direction of the second fixed rod 6034. In an embodiment, the second fixed rod 6034 is fastened to the step surface of the second rigid support plate 604c. Specifically, two ends of the second fixed rod 6034 may be separately fastened to different positions on the step surface of the second rigid support plate 604c. In an embodiment, the second fixed rod 6034 may be covered in a housing.

It should be noted that the first fixed rod or the second fixed rod is made of a non-conductive material such as plastic. The first fixed rod (or the second fixed rod) helps improve flatness of the charging pad and improve reliability of a connection on the first end part (or the second end part)

and a connection between the metal lines located in the first flexible part, and further facilitates in positioning during welding.

It should be noted that in this application, ordinal numbers such as "first", "second", "third", and "fourth" that are used before a name are merely used for distinguishing (for example, the first end part and the second end part are used for explaining that the first end part and the second end part are different end parts), and do not have any limitation. For example, the second end part includes the third horizontal part and the fourth horizontal part. This is merely used to indicate that the second end part includes two horizontal parts, instead of indicating that the second end part further includes a first horizontal part and a second horizontal part. The third horizontal part and the fourth horizontal part are named herein because the first horizontal part and the second horizontal part are used in other parts of this application. To avoid confusion, in this specification, the two horizontal parts located in the second end part are respectively named the third horizontal part and the fourth horizontal part.

When the charging pad further includes the second rigid support plate, and the first planar coil further includes the second rigid part, if the charging pad is wound around the roll shaft, a region in which the second rigid part is located covers a second plane of the roll shaft. It should be noted that the second plane is adjacent to the first round corner, and the second plane and the first plane are respectively located on two sides of the first round corner. Certainly, the second plane is also one of the plurality of planes included in the side wall of the roll shaft.

Figure 7A:
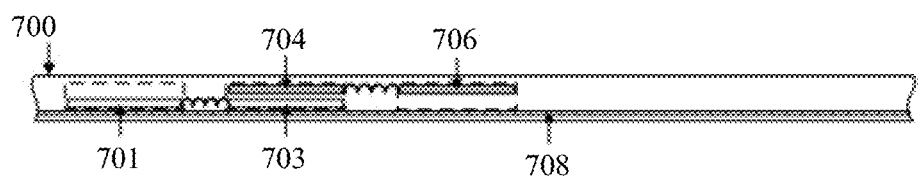
FIG. 7A is a schematic diagram of still another charging pad according to an embodiment of this application.
Figure 7B:
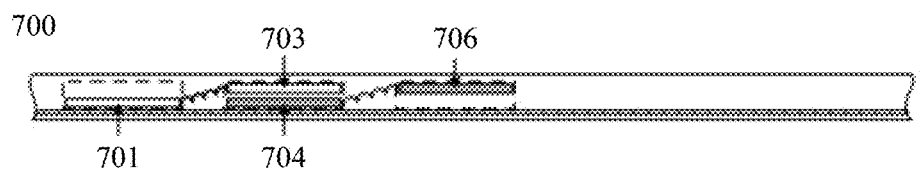
FIG. 7B is a schematic diagram of still another charging pad according to an embodiment of this application.
Figure 7C:
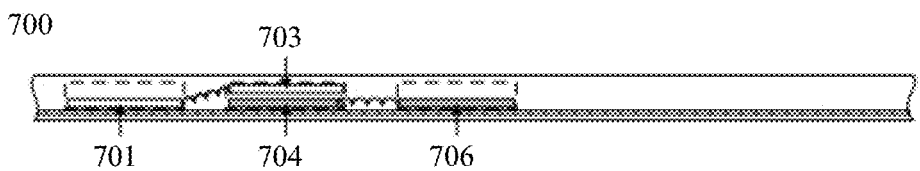
FIG. 7C is a schematic diagram of still another charging pad according to an embodiment of this application.

Based on the foregoing charging pad embodiments, this application further provides the following embodiments. In an embodiment, as shown in FIG. 7A, FIG. 7B, and FIG. 7C, the charging pad 700 further includes at least one second planar coil and at least one third rigid support plate 704. The second planar coil includes a third rigid part and a second flexible part that are adjacent to each other. The third rigid part includes a plurality of conducting wires, and the second flexible part includes a plurality of metal lines. It should be noted that the metal lines located in the second flexible part are bendable. Further, the second flexible part and the first flexible part are respectively located on two sides of the third rigid support plate 704. The third rigid part is located on an upper surface of the third rigid support plate 704. In an embodiment, the third rigid support plate 704a may be a printed circuit board. In this case, a conducting wire located in the third rigid part may be printed or etched on the upper surface of the third rigid support plate 704. The multilayer printed circuit board may be a multilayer board. It should be noted that, in this embodiment, the third rigid support plate 704 and the second rigid support plate 703 are placed in a stack-up manner. In an embodiment, an edge of the third rigid support plate 704 is aligned with an edge of the second rigid support plate 703.

It should be noted that the third rigid support plate 704 and the second rigid support plate 703 may be two subboards that are stacked in a same printed circuit board.

When the charging pad in this embodiment is wound around the roll shaft, a region in which the second flexible part is located covers a second round corner of the roll shaft. It should be noted that the second round corner is adjacent to the second plane, and the second round corner and the first round corner are respectively located on two sides of the second plane. It should be known that the second round corner is located on a side wall of the roll shaft, and is one of the plurality of round corners included in the roll shaft.

It should be noted that, in the charging pad described in this embodiment, the third rigid support plate is located in a same region on the charging pad as the second rigid support plate.

Further, as shown in FIG. 7A, FIG. 7B, and FIG. 7C, the charging pad 700 further includes a fourth rigid support plate 706. Correspondingly, the second planar coil further includes a fourth rigid part. The second flexible part is located between the third rigid part and the fourth rigid part, and is separately adjacent to the third rigid part and the fourth rigid part. The fourth rigid part is located on an upper surface of the fourth rigid support plate 706. In an embodiment, the fourth rigid support plate 706 may be a printed circuit board. In this case, a conducting wire located in the fourth rigid part may be printed or etched on the upper surface of the fourth rigid support plate 706.

In an embodiment of this embodiment, as shown in FIG. 7A, a lower surface of the third rigid support plate 704 faces the upper surface of the second rigid support plate 703, and the upper surface of the third rigid support plate 704 is far away from the upper surface of the second rigid support plate 703. In other words, the third rigid support plate 704 is placed above the second rigid support plate 703. In an embodiment, the upper surface of the second rigid support plate 703 is located in a same plane as the upper surface of the first rigid support plate 701.

Further, the upper surface of the fourth rigid support plate 706 is located in a same plane as the upper surface of the third rigid support plate 704, or the upper surface of the fourth rigid support plate 706 is located in a same plane as the upper surface of the second rigid support plate 703.

In another embodiment of this embodiment, as shown in FIG. 7B and FIG. 7C, the lower surface of the second rigid support plate 703 faces the upper surface of the third rigid support plate 704, and the upper surface of the second rigid support plate 703 is far away from the upper surface of the third rigid support plate 704. In other words, the second rigid support plate 703 is placed above the third rigid support plate 704. In an embodiment, the upper surface of the third rigid support plate 704 is located in a same plane as the upper surface of the first rigid support plate 701.

Further, as shown in FIG. 7C, the upper surface of the fourth rigid support plate 706 is located in a same plane as the upper surface of the third rigid support plate 704. Alternatively, as shown in FIG. 7B, the upper surface of the fourth rigid support plate 706 is located in a same plane as the upper surface of the second rigid support plate 703.

When the upper surface of the third rigid support plate 704 is located in a same plane as the upper surface of the first rigid support plate 701, it is easily known that the first rigid support plate 701 is located at a same layer as the third rigid support plate 704, and the second rigid support plate 703 is located at an upper layer relative to the third rigid support plate 704. When the charging pad is relatively thin, a distance between the first planar coil and a to-be-charged terminal device is relatively short. In this case, overcoupling easily occurs between a transmit end and a receive end during wireless charging. Consequently, a frequency bifurcation problem arises. In this embodiment, the second rigid support plate 703 is disposed above the third rigid support plate 704, so that a distance between the first rigid part of the first planar coil and the receive end is longer than a distance between the second rigid part of the first planar coil and the receive end. This design can resolve, to some extent, the frequency bifurcation problem caused by the overcoupling, so that the charging pad can be further thinned.

Further, the upper surface of the first rigid support plate 701 and the upper surface of the second rigid support plate 703 are located in different planes, and the second rigid support plate 703 is located at an upper layer relative to the first rigid support plate 701. Therefore, a metal line in a flexible region is applicable to the structures shown in FIG. 5B, FIG. 6A, and FIG. 6B. In addition, it is easily understood that some variations should be made. The first end part should be connected (or welded) to the top of the first rigid support plate, while the second end part should be connected (or welded) to the bottom of the second rigid support plate.

When the charging pad further includes the fourth rigid support plate, and the second planar coil further includes the fourth rigid part, if the charging pad is wound around the roll shaft, a region in which the fourth rigid support plate is located covers a third plane of the roll shaft. It should be known that the third plane is adjacent to the second round corner, and the third plane and the second plane are respectively located on two sides of the second round corner. The third plane is also one of the plurality of planes included in the side wall of the roll shaft.

Figure 8A:
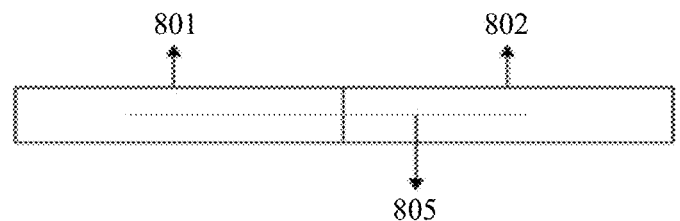
FIG. 8A is a schematic diagram of still another charging pad according to an embodiment of this application.

This application further provides another charging pad. As shown in FIG. 8A, the charging pad includes a first planar coil 805, a first printed circuit board 801, and a first flexible circuit board 802. The first planar coil 805 includes a first part and a second part that are adjacent to each other. Further, the first part is etched on a surface of or inside the first printed circuit board 801, and the second part is etched on a surface of or inside the first flexible circuit board 802.

In an embodiment, the first printed circuit board 801 has a same thickness as the first flexible circuit board 802.

When the charging pad described in this embodiment is wound around the roll shaft, a region in which the first printed circuit board is located covers a plane of the roll shaft, and a region in which the first flexible circuit board is located covers a round corner of the roll shaft. It should be known that the plane is adjacent to the round corner.

Figure 8B:
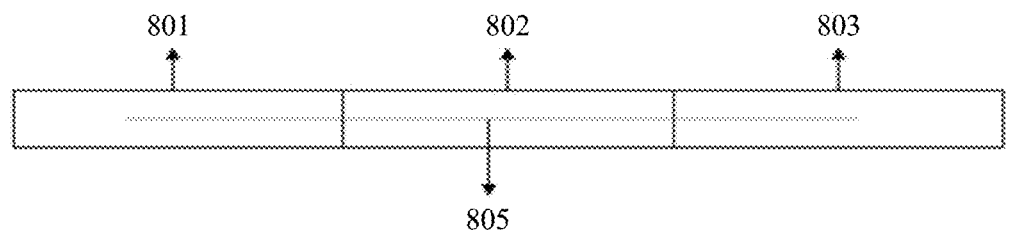
FIG. 8B is a schematic diagram of still another charging pad according to an embodiment of this application.

Further, as shown in FIG. 8B, the first planar coil 805 further includes a third part adjacent to the second part, and the second part is located between the first part and the third part. It should be noted that the third part is etched on a surface of or inside a second printed circuit board 803.

When the charging pad described in this embodiment is wound around the roll shaft, a region in which the first printed circuit board is located covers a plane of the roll shaft, a region in which the first flexible circuit board is located covers a round corner of the roll shaft, and a region in which the second printed circuit board is located covers another plane of the roll shaft. It should be known that both the plane and the another plane are adjacent to the round corner, and are respectively located on two sides of the round corner.

Figure 9:
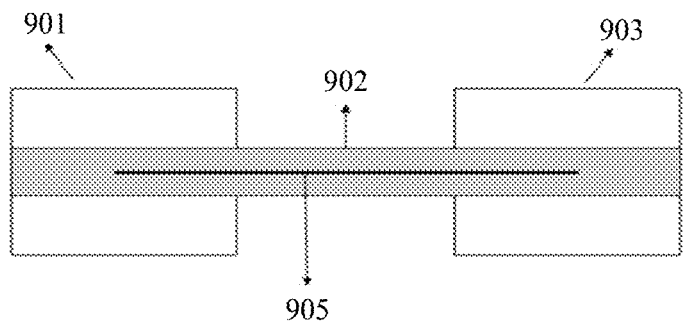
FIG. 9 is a schematic diagram of still another charging pad according to an embodiment of this application.

This application further provides another charging pad. As shown in FIG. 9, the charging pad includes a first planar coil 905, a first printed circuit board 901, a first flexible circuit board 902, and a second printed circuit board 903. The first planar coil 905 is located on a surface of or inside the first flexible circuit board 902. In an embodiment, the first planar coil 905 is etched on a surface of or inside the first flexible circuit board 902. Further, a first part of the first flexible circuit board 902 is laminated into the first printed circuit board 901, and a second part is laminated into the second printed circuit board 903. It should be noted that, in addition to the first part and the second part, the first flexible circuit board 902 further includes another part, and another part is located between the first part and the second part.

In an embodiment, the first printed circuit board 901 has a same thickness as the second printed circuit board 903.

When the charging pad described in this embodiment is wound around a roll shaft, a region in which the first printed circuit board is located covers a plane of the roll shaft, a region in which the another part is located covers a round corner of the roll shaft, and a region in which the second printed circuit board is located covers another plane of the roll shaft. It should be known that both the plane and the another plane are adjacent to the round corner, and are respectively located on two sides of the round corner.

In still another embodiment of this application, as shown in FIG. 7A, the charging pad 700 may further include a magnetic conductive sheet 708. As shown in FIG. 7A, a lower surface of a rigid support plate located at a lowermost layer (for example, the lower surface of the first rigid support plate 701) is in contact with an upper surface of the magnetic conductive sheet 708. When the upper surface of the second rigid support plate 703 is located in the same plane as the upper surface of the first rigid support plate 701 (as shown in FIG. 7A), both the second rigid support plate 703 and the first rigid support plate 701 may be rigid support plates located at the lowermost layer. In this case, both the lower surface of the second rigid support plate 703 and the lower surface of the first rigid support plate 701 are in contact with the upper surface of the magnetic conductive sheet 708. When the upper surface of the first rigid support plate 701, the upper surface of the third rigid support plate 704, and the upper surface of the fourth rigid support plate 706 are all located in a same plane (as shown in FIG. 7C), the first rigid support plate 701, the third rigid support plate 704, and the fourth rigid support plate 706 may all be rigid support plates at the lowermost layer. In this case, the lower surface of the first rigid support plate 701, the lower surface of the third rigid support plate 704, and a lower surface of the fourth rigid support plate 706 are all in contact with the upper surface of the magnetic conductive sheet 708.

In an embodiment, the charging pad may further include a plurality of magnetic conductive sheets. A quantity of the plurality of magnetic conductive sheets is the same as a quantity of rigid support plates located at the lowermost layer of the charging pad, and the plurality of magnetic conductive sheets are in a one-to-one correspondence with a plurality of rigid support plates located at the lowermost layer. In an embodiment, when the upper surface of the second rigid support plate is located in the same plane as the upper surface of the first rigid support plate, both the second rigid support plate and the first rigid support plate may be rigid support plates located at the lowermost layer. In this case, the lower surface of the second rigid support plate is in contact with an upper surface of a magnetic conductive sheet, and the lower surface of the first rigid support plate is in contact with an upper surface of another magnetic conductive sheet. In an embodiment, an edge of each magnetic conductive sheet is aligned with an edge of a corresponding rigid support plate.

It should be noted that the magnetic conductive sheet may be made of a magnetic material. The magnetic material may be one or more of a ferrite material, an amorphous material, a nano-crystal material, a metal powder core material, or the like.

Figure 10A:
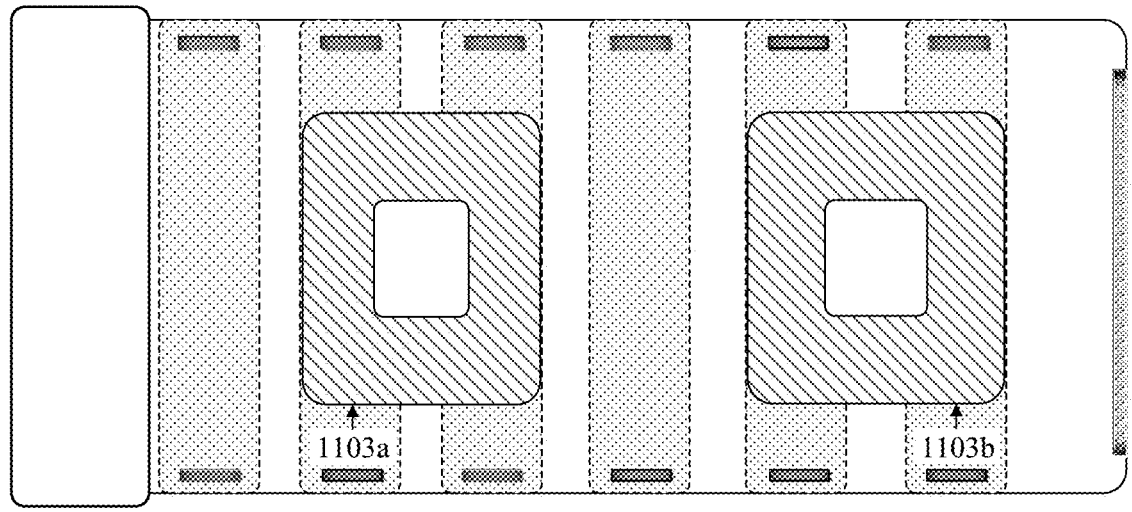
FIG. 10A is a schematic diagram of a wireless charger according to an embodiment of this application.
Figure 10B:
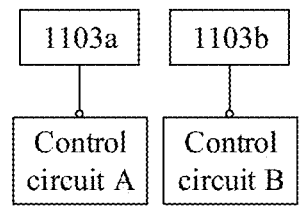
FIG. 10B is a schematic diagram of a control structure in the wireless charger shown in FIG. 10A.

In still another embodiment of this application, as shown in FIG. 10A, the charging pad includes a plurality of first planar coils (1103*a* and 1103*b*) that are isolated from each other, and each first planar coil includes a first rigid part, a second rigid part, and a first flexible part located between the first rigid part and the second rigid part. Correspondingly, each first rigid part is supported by one first rigid support plate, and each second rigid part is supported by one second rigid support plate. As shown in FIG. 10B, when the charging pad provided in this embodiment is applied to a wireless charger, the wireless charger includes a plurality of control circuits (for example, a control circuit A and a control circuit B).

In an embodiment, each control circuit is configured to control one or more of the first planar coils. It should be known that a first planar coil may be controlled to be powered on or powered off by connecting and disconnecting a corresponding control circuit. In an embodiment, as shown in FIG. 10B, the plurality of first planar coils are in a one-to-one correspondence with the plurality of control circuits. In other words, each control circuit is configured to control one of the first planar coils.

It should be known that, when the charging pad includes the plurality of first planar coils that are isolated from each other, the charging pad can simultaneously charge a plurality of terminal devices.

Figure 11A:
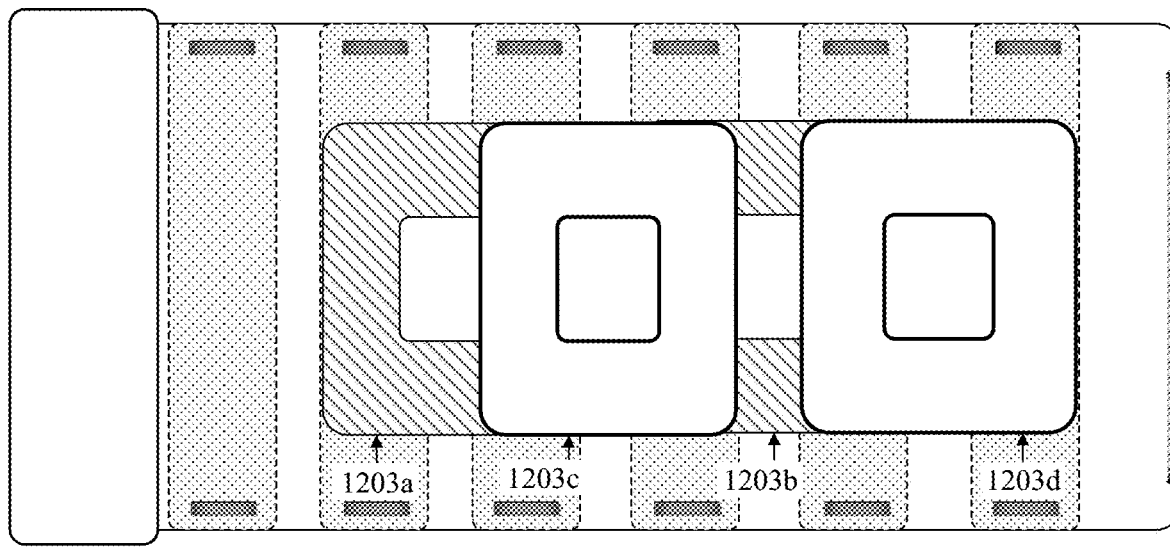
FIG. 11A is a schematic diagram of another wireless charger according to an embodiment of this application.
Figure 11B:
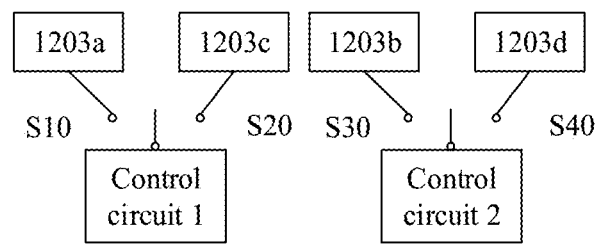
FIG. 11B is a schematic diagram of a control structure in the wireless charger shown in FIG. 11A.

As shown in FIG. 11A, on a basis that the charging pad includes the plurality of first planar coils (for example, first planar coils 1203a and 1203b) that are isolated from each other, the charging pad may further include a plurality of second planar coils (for example, second planar coils 1203c and 1203d). It should be known that a quantity of the second planar coils is less than or equal to a quantity of the first planar coils. As described above, the second planar coil includes a third rigid part, a fourth rigid part, and a second flexible part located between the third rigid part and the fourth rigid part. The third rigid part is supported by a third rigid support plate, and the fourth rigid part is supported by a fourth rigid support plate. It should be noted that the third rigid support plate and the second rigid support plate are placed in a stack-up manner. In an embodiment, an edge of the third rigid support plate is aligned with an edge of the second rigid support plate. Further, in an embodiment, a projection of the third rigid part on an upper surface of the second rigid support plate at least partially overlaps with the second rigid part. As shown in FIG. 11B, when the charging pad provided in this embodiment is applied to a wireless charger, the wireless charger includes a plurality of control circuits (for example, a control circuit A and a control circuit B).

In an embodiment, each control circuit may control at least one first planar coil or at least one second planar coil, or may control both the at least one first planar coil and the at least one second planar coil. As shown in FIG. 11B, a control circuit 1 controls both the first planar coil 1203a and the second planar coil 1203c, and a control circuit 2 controls both the first planar coil 1203b and the second planar coil 1203d.

Figure 12A:
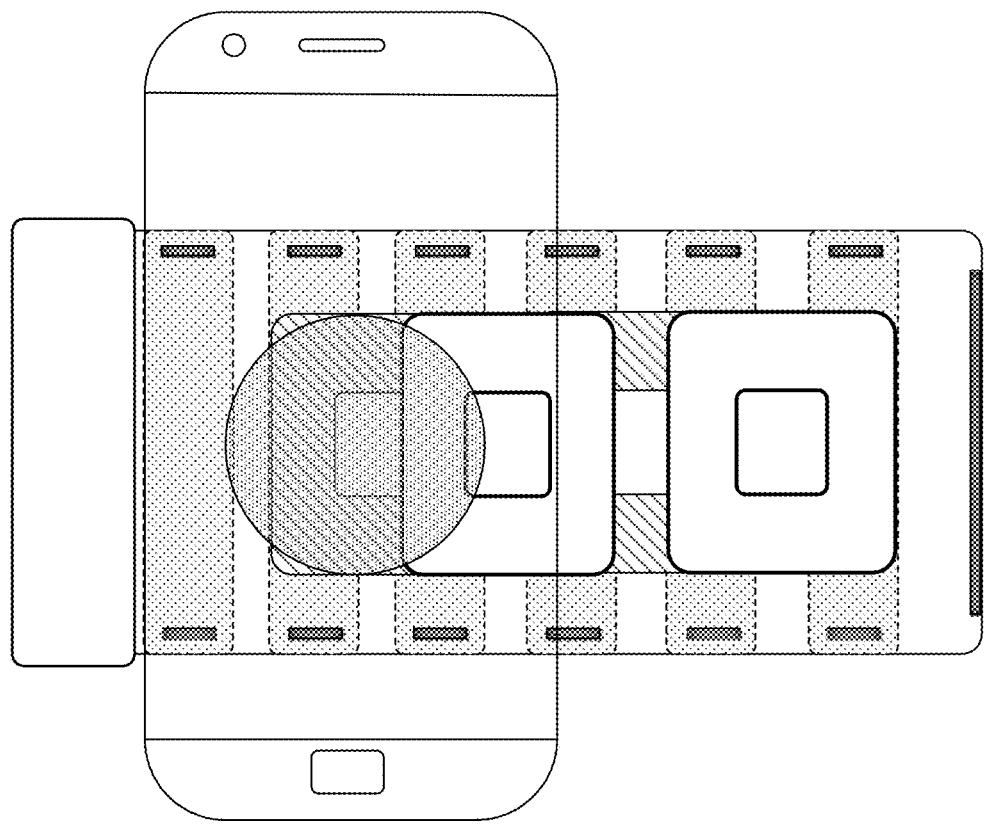
FIG. 12A is a diagram of an application scenario of a wireless charger according to an embodiment of this application.
Figure 12B:
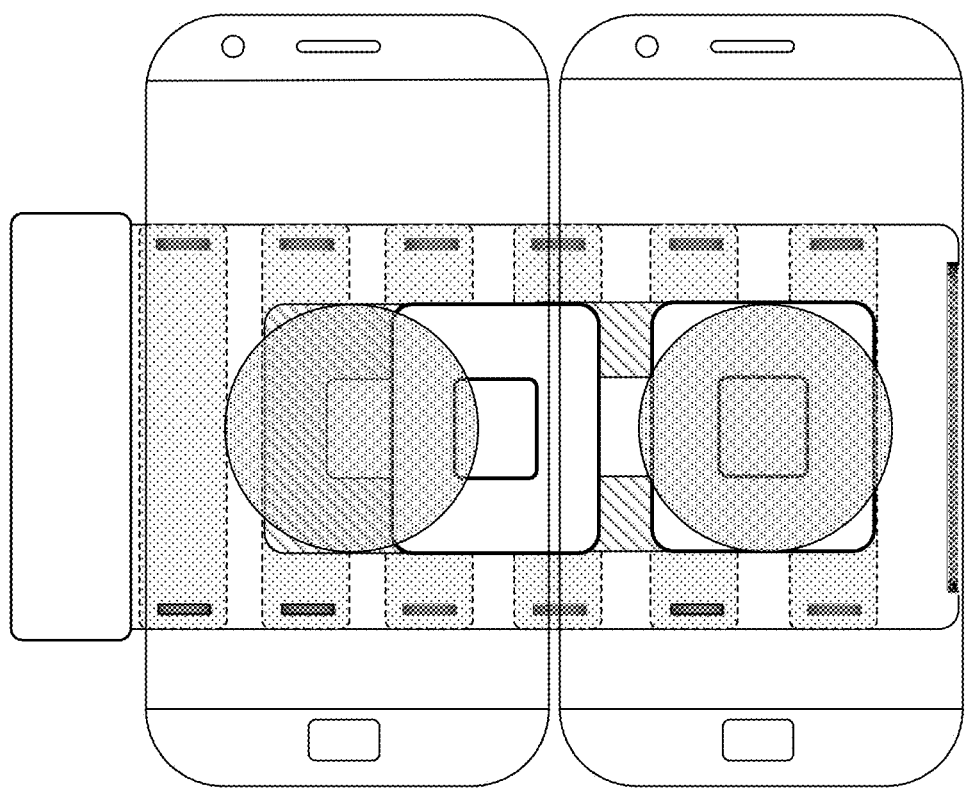
FIG. 12B is a diagram of another application scenario of a wireless charger according to an embodiment of this application.

It is easily known that, as shown in FIG. 12A and FIG. 12B, when the charging pad provided in this embodiment is applied to the wireless charger, the wireless charger may charge only one to-be-charged device, or may charge at least two to-be-charged devices.

It should be known that a plurality of charging pads provided in this application may be applied to the wireless charger provided in this application.

Figure 13:
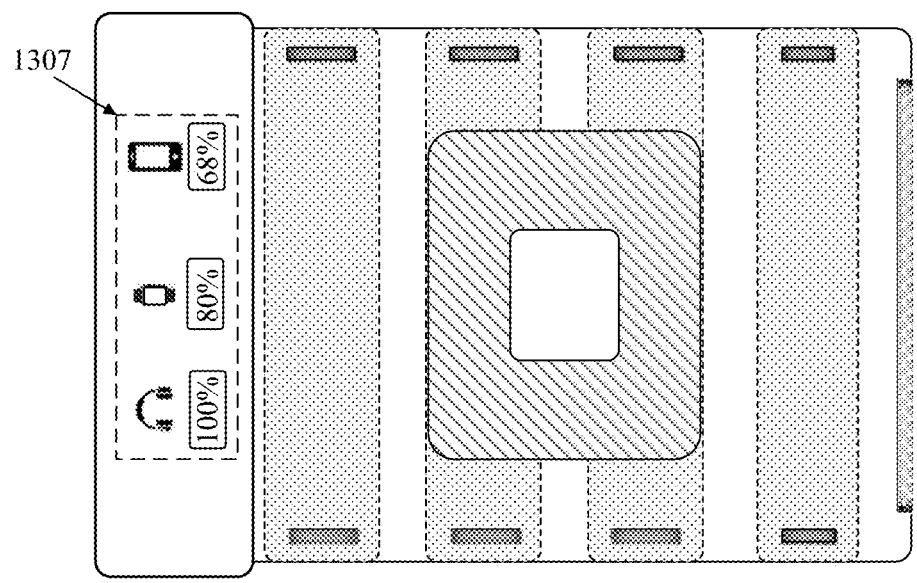
FIG. 13 is a schematic diagram of a wireless charger according to an embodiment of this application.

This application further provides a charging method of a wireless charger. It should be noted that the wireless charger is the wireless charger described in the foregoing embodiments. Further, as shown in FIG. 13, the wireless charger 1300 further includes a display component 1037. The display component 1037 is configured to display battery power information of a charged device.

Figure 14:
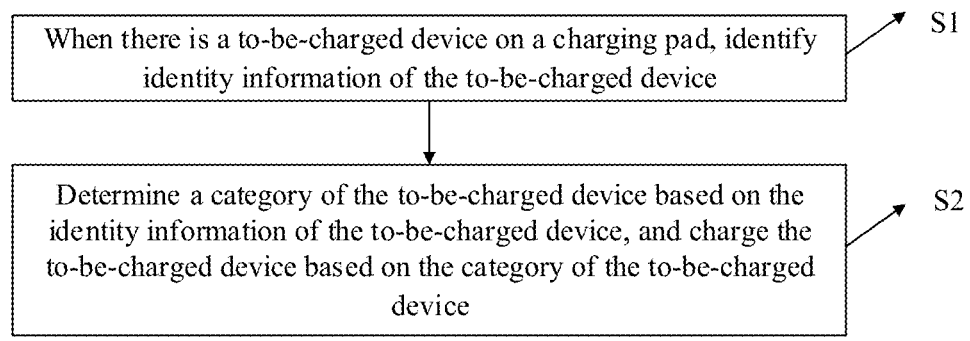
FIG. 14 is a flowchart of a wireless charging method according to an embodiment of this application.

In an embodiment, as shown in FIG. 14, the charging method includes the following operations.

S1. When there is a to-be-charged device on a charging pad of the wireless charger, the wireless charger identifies identity information of the to-be-charged device.

Before operation S1, the method further includes: detecting, by the wireless charger, whether there is a to-be-charged device on the charging pad.

In an embodiment, when there is a to-be-charged device on the charging pad of the wireless charger, the wireless charger further establishes a communication connection to the to-be-charged device, obtains configuration information of the to-be-charged device through the connection, and determines identity information of the to-be-charged device based on the configuration information.

It should be known that the identity information of the to-be-charged device is used to uniquely identify the to-be-charged device.

It should be noted that the wireless charger may communicate with the to-be-charged device in a short-distance communication manner, for example, in-band communication, Bluetooth communication, or a wireless network (e.g., Wi-Fi).

S2. The wireless charger determines a category of the to-be-charged device based on the identity information of the to-be-charged device, and charges the to-be-charged device based on the category of the to-be-charged device.

A plurality of to-be-charged devices belonging to a same category can accept a same charging voltage, a same charging current, or same charging power. The category of the to-be-charged device may include a mobile phone, a watch, a headset, or the like.

In an embodiment, after operation S2, the method may further include: receiving and displaying, by the wireless charger, battery power information of the to-be-charged device in real time.

In an embodiment, after the determining a category of the to-be-charged device, the method may further include: displaying the category of the to-be-charged device.

It should be known that the battery power information of the to-be-charged device is sent by the to-be-charged device to the wireless charger.

Further, the wireless charger further includes different types of lights (for example, a breathing light). In an embodiment, there is one light in each type of light. Each type of light is corresponding to a to-be-charged device of one category, and each category of to-be-charged device is corresponding to a light of one type. Operation S2 includes: determining, by the wireless charger, the category of the to-be-charged device based on an identifier of the to-be-charged device, switching on a corresponding type of light according to the category of the to-be-charged device, and charging the to-be-charged device.

It should be noted that the foregoing embodiments are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A wireless charger, comprising:
 a roll shaft having a side wall including a plurality of planes and a round corner located between two adjacent planes; and a charging pad having a side embedded in the roll shaft, the charging pad capable of winding around the roll shaft along the side, wherein the charging pad comprises:
   a first planar coil having a first rigid part and a first flexible part adjacent to each other, and
   a first rigid support plate, wherein the first rigid part is located on an upper surface of the first rigid support plate, and a metal line located in the first flexible part is bendable; and
wherein when the charging pad is wound around the roll shaft, a region in which the first rigid support plate is located covers a first plane of the roll shaft, and a region in which the first flexible part is located covers a first round corner of the roll shaft.

2. The wireless charger according to claim 1, wherein the charging pad further comprises a second rigid support plate, and the first planar coil further comprises a second rigid part adjacent to the first flexible part, wherein the first flexible part is located between the first rigid part and the second rigid part, and the second rigid part is located on an upper surface of the second rigid support plate; and
   when the charging pad is wound around the roll shaft, a region in which the second rigid support plate is located covers a second plane of the roll shaft.

3. The wireless charger according to claim 2, wherein the charging pad further comprises a second planar coil and a third rigid support plate, the second planar coil comprises a third rigid part and a second flexible part adjacent to each other, the third rigid part is located on an upper surface of the third rigid support plate, and another metal line located in the second flexible part is bendable;
   if the third rigid support plate and the second rigid support plate are placed in a stack-up manner, a region on the charging pad in which the third rigid support plate is located is the same as the region in which the second rigid support plate is located; and
   if the second flexible part and the first flexible part are respectively located on two sides of the third rigid part, when the charging pad is wound around the roll shaft, a region in which the second flexible part is located covers a second round corner of the roll shaft.

4. The wireless charger according to claim 3, wherein the charging pad further comprises a fourth rigid support plate, and the second planar coil further comprises a fourth rigid part adjacent to the second flexible part, wherein the second flexible part is located between the third rigid part and the fourth rigid part, and the fourth rigid part is located on an upper surface of the fourth rigid support plate; and
   when the charging pad is wound around the roll shaft, a region in which the fourth rigid support plate is located covers a third plane of the roll shaft.

5. A charging pad, comprising:
   a first planar coil comprising a conducting wire in a first rigid part and a second rigid part, and a bendable metal wire in a first flexible part, wherein the first rigid part and the second rigid part are adjacent to the first flexible part and the conducting wire is connected to the bendable metal wire;
   a first rigid support plate, wherein the first rigid part is located on an upper surface of the first rigid support plate; and
   a second rigid support plate, wherein the second rigid part is located on an upper surface of the second rigid support plate.

6. The charging pad according to claim 5, wherein the bendable metal wire located in the first flexible part comprises a first end part close to the first rigid part, a second end part close to the second rigid part, and a main body part located between the first end part and the second end part, the first end part is connected to the conducting wire in the first rigid part, and the second end part is connected to another conducting wire in the second rigid part; and
   a sum of a thickness of the first rigid support plate and a thickness of a joint part of the first end part and the conducting wire located in the first rigid part is greater than or equal to a thickness of the main body part, and a sum of a thickness of the second rigid support plate and a thickness of a joint part of the second end part and the conducting wire located in the second rigid part is also greater than or equal to the thickness of the main body part.

7. The charging pad according to claim 6, wherein the main body part comprises a plurality of metal segments that are connected in series, two adjacent metal segments are hinged to each other, the plurality of metal segments comprise a first metal segment, a second metal segment, and at least one metal segment located between the first metal segment and the second metal segment, one end of the first metal segment is hooked to the first end part, and one end of the second metal segment is hooked to the second end part.

8. The charging pad according to claim 7, wherein the first end part comprises a horizontal part, a vertical part, and a corner located between the horizontal part and the vertical part, and the first metal segment comprises a hook part, an extension part, and a corner located between the hook part and the extension part;
   the horizontal part of the first end part is fitted to the upper surface of the first rigid support plate and connected to the conducting wire in the first rigid part, and the vertical part of the first end part extends from the corner of the first end part in a direction away from the upper surface of the first rigid support plate; and
   the hook part of the first metal segment is cross-hooked to the vertical part of the first end part, the extension part of the first metal segment extends from the corner of the first metal segment in a direction away from the first rigid support plate but towards a side wall of the first flexible part, and the extension part of the first metal segment is hinged to an adjacent metal segment.

9. The charging pad according to claim 8, wherein a side wall of the vertical part of the first end part faces an inner surface of the extension part of the first metal segment, and a side wall of the hook part of the first metal segment faces an inner surface of the horizontal part of the first end part.

10. The charging pad according to claim 7, wherein the second end part comprises a horizontal part, a vertical part, and a corner located between the horizontal part and the vertical part, and the second metal segment comprises a hook part, an extension part, and a corner located between the hook part and the extension part;
   the horizontal part of the second end part is fitted to the upper surface of the second rigid support plate and connected to the other conducting wire in the second rigid part, and the vertical part of the second end part extends from the corner of the second end part in a direction away from the upper surface of the second rigid support plate; and
   the hook part of the second metal segment is cross-hooked to the vertical part of the second end part, the extension part of the second metal segment extends from the corner of the second metal segment in a direction away from the second rigid support plate but towards a side wall of the first flexible part, and the extension part of the second metal segment is hinged to an adjacent metal segment.

11. The charging pad according to claim 10, wherein a side wall of the vertical part of the second end part faces an inner surface of the extension part of the second metal segment, and a side wall of the hook part of the second metal segment faces an inner surface of the horizontal part of the second end part.

12. The charging pad according to claim 6, wherein the main body part is a metal conducting wire.

13. The charging pad according to claim 12, wherein a step is disposed on an edge of the first rigid support plate and close to the first flexible part, the upper surface of the first rigid support plate comprises a top surface and a step surface, and the top surface of the first rigid support plate protrudes relative to the step surface of the first rigid support plate;

the first end part comprises a first horizontal part, a first vertical part, and a second horizontal part, and the first vertical part of the first end part is located between the first horizontal part and the second horizontal part of the first end part;

the first horizontal part of the first end part is fitted to the upper surface of the first rigid support plate and connected to the conducting wire located in the first rigid part, and the second horizontal part of the first end part is fitted to the step surface of the first rigid support plate and connected to one end of the metal conducting wire located in the first flexible part; and the first vertical part of the first end part is fitted to an upper side wall of the first rigid support plate, and the upper side wall of the first rigid support plate is located between the top surface and the step surface of the first rigid support plate and faces the first flexible part.

14. The charging pad according to claim 13, further comprising a first fixed rod crossing second horizontal parts of a plurality of the first end parts, wherein the first fixed rod is fastened to the step surface of the first rigid support plate in a longitudinal direction of the first fixed rod.

15. The charging pad according to claim 12, wherein a step is disposed on an edge of the second rigid support plate and close to the first flexible part, the upper surface of the second rigid support plate comprises a top surface and a step surface, and the top surface of the second rigid support plate protrudes relative to the step surface of the second rigid support plate;

the second end part comprises a third horizontal part, a second vertical part, and a fourth horizontal part, and the second vertical part of the second end part is located between the third horizontal part and the fourth horizontal part of the second end part;

the third horizontal part of the second end part is fitted to the top surface of the second rigid support plate and connected to the conducting wire located in the second rigid part, and the fourth horizontal part of the second end part is fitted to the step surface of the second rigid support plate and connected to a second end of the bendable metal wire located in the first flexible part, wherein the bendable metal wire comprises a first end and the second end opposite to the first end; and the second vertical part of the second end part is fitted to an upper side wall of the second rigid support plate, and the upper side wall of the second rigid support plate is located between the top surface and the step surface of the second rigid support plate and faces the first flexible part.

16. The charging pad according to claim 5, further comprising a second planar coil and a third rigid support plate, wherein the second planar coil comprises a third rigid part and a second flexible part that are adjacent to each other, the third rigid part is located on an upper surface of the third rigid support plate, another metal line located in the second flexible part is bendable, the third rigid support plate and the second rigid support plate are placed in a stack-up manner, and the second flexible part and the first flexible part are respectively located on two sides of the third rigid part.

17. The charging pad according to claim 16, wherein a lower surface of the third rigid support plate faces the upper surface of the second rigid support plate, the upper surface of the third rigid support plate is far away from the upper surface of the second rigid support plate, and the upper surface of the second rigid support plate is located in a same plane as the upper surface of the first rigid support plate.

18. The charging pad according to claim 17, further comprising a fourth rigid support plate, wherein the second planar coil further comprises a fourth rigid part adjacent to the second flexible part, the second flexible part is located between the third rigid part and the fourth rigid part, the fourth rigid part is located on an upper surface of the fourth rigid support plate, and the upper surface of the fourth rigid support plate is located in a same plane as the upper surface of the third rigid support plate, or the upper surface of the fourth rigid support plate is located in a same plane as the upper surface of the second rigid support plate.

19. The charging pad according to claim 16, wherein a lower surface of the second rigid support plate faces the upper surface of the third rigid support plate, the upper surface of the second rigid support plate is far away from the upper surface of the third rigid support plate, and the upper surface of the third rigid support plate is located in a same plane as the upper surface of the first rigid support plate.

* * * * *